(12) United States Patent
Nakao

(10) Patent No.: US 7,830,758 B2
(45) Date of Patent: Nov. 9, 2010

(54) OPTICAL DISK DRIVE AND PICKUP DEVICE

(75) Inventor: Takashi Nakao, Tokyo (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 11/820,221

(22) Filed: Jun. 18, 2007

(65) Prior Publication Data

US 2007/0291602 A1    Dec. 20, 2007

(30) Foreign Application Priority Data

Jun. 19, 2006    (JP) .............................. 2006-168969

(51) Int. Cl.
  *G11B 7/00* (2006.01)
(52) U.S. Cl. ................... 369/44.29; 369/53.2
(58) Field of Classification Search ............. 369/44.41, 369/44.29, 53.2, 53.22, 53.23, 53.28, 44.35
See application file for complete search history.

(56) References Cited

U.S. PATENT DOCUMENTS

| 6,091,690 | A * | 7/2000 | Sano et al. ............... 369/44.23 |
| 7,142,489 | B2 * | 11/2006 | Nishiwaki et al. ........ 369/44.41 |
| 7,428,201 | B2 * | 9/2008 | Nakao et al. ............. 369/53.22 |
| 2007/0189130 | A1 * | 8/2007 | Anzai et al. .............. 369/44.23 |
| 2007/0189141 | A1 * | 8/2007 | Okamatsu .................. 369/53.2 |
| 2008/0084804 | A1 * | 4/2008 | Ishii ........................ 369/53.22 |

FOREIGN PATENT DOCUMENTS

| JP | 3438160 | 6/2003 |
| JP | 2004-281026 A | 10/2004 |

* cited by examiner

*Primary Examiner*—Wayne R Young
*Assistant Examiner*—Brenda Bernardi
(74) *Attorney, Agent, or Firm*—Wolf, Greenfield & Sacks, P.C.

(57) ABSTRACT

An optical disk drive includes focusing means, moving means for moving the focusing means in a direction perpendicular to a track direction, light detection means having a first light acceptance section accepting a light beam reflected by one information recording layer and a second light acceptance section accepting stray light reflected by another information recording layer, tracking error signal generating means for generating and correcting the tracking error signal using an output of the second light acceptance section, and tracking control means, wherein the second light acceptance section is composed of a disk inner area and a disk outer area, and where the stray light is accepted without accepting the light beam, and the tracking control means removes an offset caused by the stray light using a difference between the output of the disk inner area and the output of the disk outer area.

11 Claims, 16 Drawing Sheets

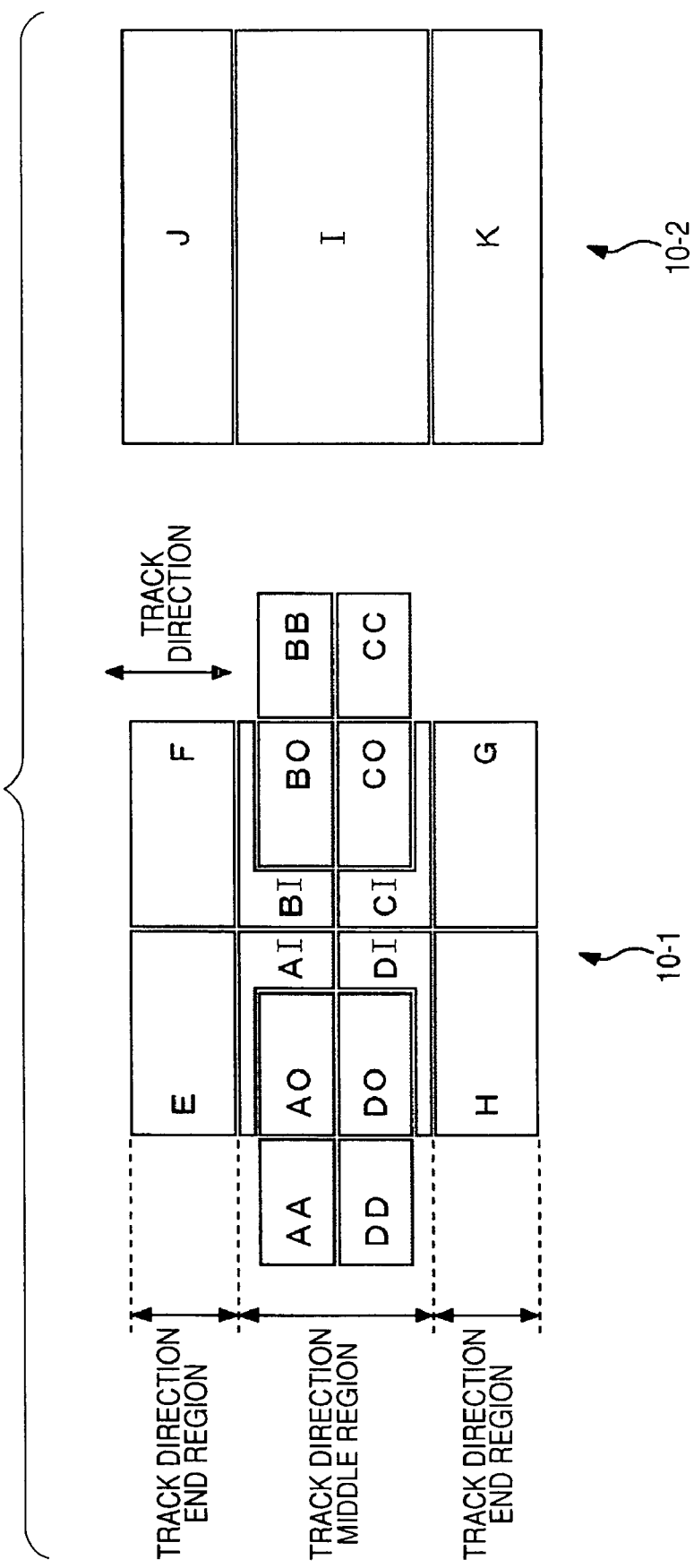

OPTICAL DISK DRIVE AND PICKUP DEVICE

CROSS REFERENCES TO RELATED APPLICATIONS

The present invention contains subject matter related to Japanese Patent Application JP 2006-168969 filed in the Japan Patent Office on Jun. 19, 2006, the entire contents of which being incorporated herein by reference.

BACKGROUND OF THE INVENTION

1. Technical Field

The present invention relates to an optical disk drive and a pickup device, and in particular to an optical disk drive and a pickup device arranged to be able to detect a DPD signal while achieving a single spot push-pull method, and further to correspond to also an optical disk in which a plurality of signal layers exist.

2. Related Art

In recent years, optical disk drives (see, for example, Japanese Patent No. 3438160 (Patent Document 1) and JP-A-2004-281026 (Patent Document 2)) have remarkably been spread.

As a method of detecting a tracking error in such optical disk drives, a single spot push-pull method, for example, is disclosed in the Patent Document 1. Since this single spot push-pull method is a method having a simple configuration and higher efficiency of utilization of a laser beam in comparison with a three beam method, it is preferably used for a recordable optical disk drive.

SUMMARY OF THE INVENTION

However, in the photo acceptance unit of the single spot push-pull method of the related art as disclosed in the Patent Document 1, a differential phase detection (DPD) signal used as a tracking error signal of a playback-only digital versatile disk (DVD) can hardly be detected.

Further, in order for obtaining various kinds of servo signals, the photo acceptance unit has been required to be divided into a number of photo acceptance areas, and in order for avoiding deterioration of reproduction signals caused by adding those of the number of photo acceptance areas, there has been a need for dividing the beam into a number of light beams used respectively for detecting the servo signals and for detecting the reproduction signal and a need, for example, for separately providing a photo acceptance unit for detecting the reproduction signal, namely a need for adopting a method with a plurality of light beams instead of the single spot push-pull method.

Although such a method having a plurality of light beams is thought to be an effective method for an optical disk having a single signal layer only, but can hardly be said to be an effective measure for an optical disk assumed to have a plurality of signal layers such as a DVD or a Blue-ray disc. This is because the method is affected by unnecessary reflected light caused by the light reflected by another signal layer, namely interlayer stray light (hereinafter simply referred to as stray light). Therefore, in the optical disk drive applying such a method having a plurality of light beams, there is a concern about the deterioration of the servo error signals and the reproduction signal.

Therefore, in the Patent Document 2, for example, there is disclosed a method of disposing the servo detection areas so as to avoid the stray light as a method corresponding to an optical disk in which two signal layers exist. However, even with the method disclosed in the Patent Document 2, it is difficult to cope with an optical disk in which three or more of the signal layers exist.

Therefore, in the present circumstances, it has been quite difficult to realize an optical disk drive (or a pickup device as a part thereof) capable of detecting the DPD signal while realizing the single spot push-pull method, and also corresponding to an optical disk in which a plurality of signal layers exist.

In view of the above described circumstances, it is desirable to provide an optical disk drive (or a pickup device as a part thereof) capable of detecting the DPD signal while realizing the single spot push-pull method, and also corresponding to an optical disk in which three or more of signal layers exist.

According to an embodiment of the invention, there is provided an optical disk drive for performing at least one of recording and reproducing an information signal on an optical disk having one or more information recording layers stacked one another on which the information signal is one of recorded and to be recorded in a predetermined track format, including focusing means for condensing a light beam on the optical disk, moving means for moving the focusing means in a direction perpendicular to a track direction of the optical disk, light detection means having a first light acceptance section accepting a light beam obtained as a result of reflection of the light beam condensed on the optical disk by the focusing means by one of the one or more information recording layers and a second light acceptance section accepting stray light obtained as a result of reflection of the light beam by another of the one or more information recording layers, tracking error signal generating means for generating a first tracking error signal representing a relative displacement between a track of the one of the information recording layers and the light beam using an output of the first light acceptance section, and correcting the first tracking error signal using an output of the second light acceptance section, and tracking control means for performing tracking control by driving the moving means in accordance with the first tracking error signal generated and corrected by the tracking error signal generating means, wherein the light beam from the optical disk to the light detection means has a constant track direction of the optical disk on the light detection means even if the position of the first light acceptance section in an optical axis direction is changed, the second light acceptance section is composed of a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers, and the tracking control means performs correction for removing an offset in the first tracking error signal caused by the stray light from the another of the one or more information recording layers using a difference between the output of the disk inner circumferential area and the output of the disk outer circumferential area in the second light acceptance section.

Further, discrimination means for discriminating the number of the information recording layers stacked in the optical disk based on the output of the second light acceptance section, and control means for changing settings of the light detection means in accordance with the number of the information recording layers discriminated by the discrimination means are provided.

The discrimination means discriminates the number of the information recording layers of the optical disk based on presence or absence and an amount of the stray light from the another of the information recording layers as the output of the second light acceptance section.

The first light acceptance section is divided in a direction perpendicular to the track direction of the one of the information recording layers into a first track direction end region as a light acceptance area in one end in the track direction, a second track direction end region as a light acceptance area in the other end in the track direction, and a track direction middle region as a light acceptance area in the middle in the track direction, further the track direction middle region is divided into at least two in a direction perpendicular to the track direction, and each of the light acceptance areas is divided into two in a direction parallel to the track direction, resulting in two light acceptance areas formed in the first track direction end region, two light acceptance areas formed in the second track direction end region, and at least four light acceptance areas formed in the track direction middle region.

The tracking control means further generates a second tracking error signal using a differential phase detection (DPD) method using an output of each of the two light acceptance areas formed in the first track direction end region, the two light acceptance areas formed in the second track direction end region, and the at least four light acceptance areas formed in the track direction middle region, and the tracking control means further performs the tracking control in accordance with the second tracking error signal instead of the first tracking error signal.

Focus error signal generating means for generating a focus error signal by detecting a size of the beam spot on the light detection means is further provided.

In the optical disk drive of an embodiment of the present invention, at least one of recording and reproducing of an information signal is performed on an optical disk having one or more information recording layers stacked one another on which the information signal is one of recorded and to be recorded in a predetermined track format. Therefore, focusing means for condensing a light beam on the optical disk, and light detection means having a first light acceptance section accepting a light beam obtained as a result of reflection of the light beam condensed on the optical disk by the focusing means by one of the one or more information recording layers and a second light acceptance section accepting stray light obtained as a result of reflection of the light beam by another of the one or more information recording layers are at least provided. Further, a tracking error signal representing a relative displacement between a track of the one of the information recording layers and the light beam is generated using the output of the first light acceptance section, and the tracking error signal thus generated is then corrected based on the output of the second light acceptance section, and the tracking control for moving the focusing means in a direction perpendicular to the track direction of the optical disk is performed in accordance with the tracking error signal thus corrected. In this case, the light beam from the optical disk to the light detection means has a constant track direction of the optical disk on the light detection means even if the position of the first light acceptance section in an optical axis direction is changed, the second light acceptance section is composed of a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers, and as a result, the correction for removing an offset in the first tracking error signal caused by the stray light from the another of the information recording layers is performed using a difference between the output of the disk inner circumferential area and the output of the disk outer circumferential area in the second light acceptance section.

According to another embodiment of the invention there is provided a pickup device to be mounted on an optical disk drive for performing at least one of recording and reproducing an information signal on an optical disk having one or more information recording layers stacked one another on which the information signal is one of recorded and to be recorded in a predetermined track format, including a first light acceptance section accepting a light beam obtained as a result of reflection of the light beam, which is irradiated by the optical disk drive and condensed on the optical disk, by one of the one or more information recording layers of the optical disk, and a second light acceptance section accepting stray light obtained as a result of reflection of the light beam by another of the one or more information recording layers, wherein the light beam from the optical disk to the pickup device has a constant track direction of the optical disk on the optical pickup device even if the position of the first light acceptance section in an optical axis direction is changed, and the second light acceptance section is composed of a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers.

The pickup device according to another embodiment of the invention is mounted on an optical disk drive for performing at least one of recording and reproducing an information signal on an optical disk having one or more information recording layers stacked one another on which the information signal is one of recorded and to be recorded in a predetermined track format, and is provided with a first light acceptance section accepting a light beam obtained as a result of reflection of the light beam, which is irradiated by the optical disk drive and condensed on the optical disk, by one of the one or more information recording layers of the optical disk, and a second light acceptance section accepting stray light obtained as a result of reflection of the light beam by another of the one or more information recording layers. Further, the light beam from the optical disk to the pickup device has a constant track direction of the optical disk on the optical pickup device even if the position of the first light acceptance section in an optical axis direction is changed, and the second light acceptance section is composed of a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers.

According to the embodiments described above, the optical disk drive or the pickup device can be provided. In particular, the optical disk drive or the pickup device capable of detecting the DPD signal while achieving the single spot push-pull method, and further coping with the optical disk in which a plurality of signal layers exists can be provided.

BRIEF DESCRIPTION OF THE DRAWINGS

FIG. 16 is a diagram showing an example of a photo acceptance surface of the photodetector applying the invention, and in particular another example of a focus near side acceptance section in the photo acceptance surface of the photodetector shown in FIG. 3 than shown in either FIG. 4 or FIG. 13.

DESCRIPTION OF THE PREFERRED EMBODIMENTS

Figure 1:
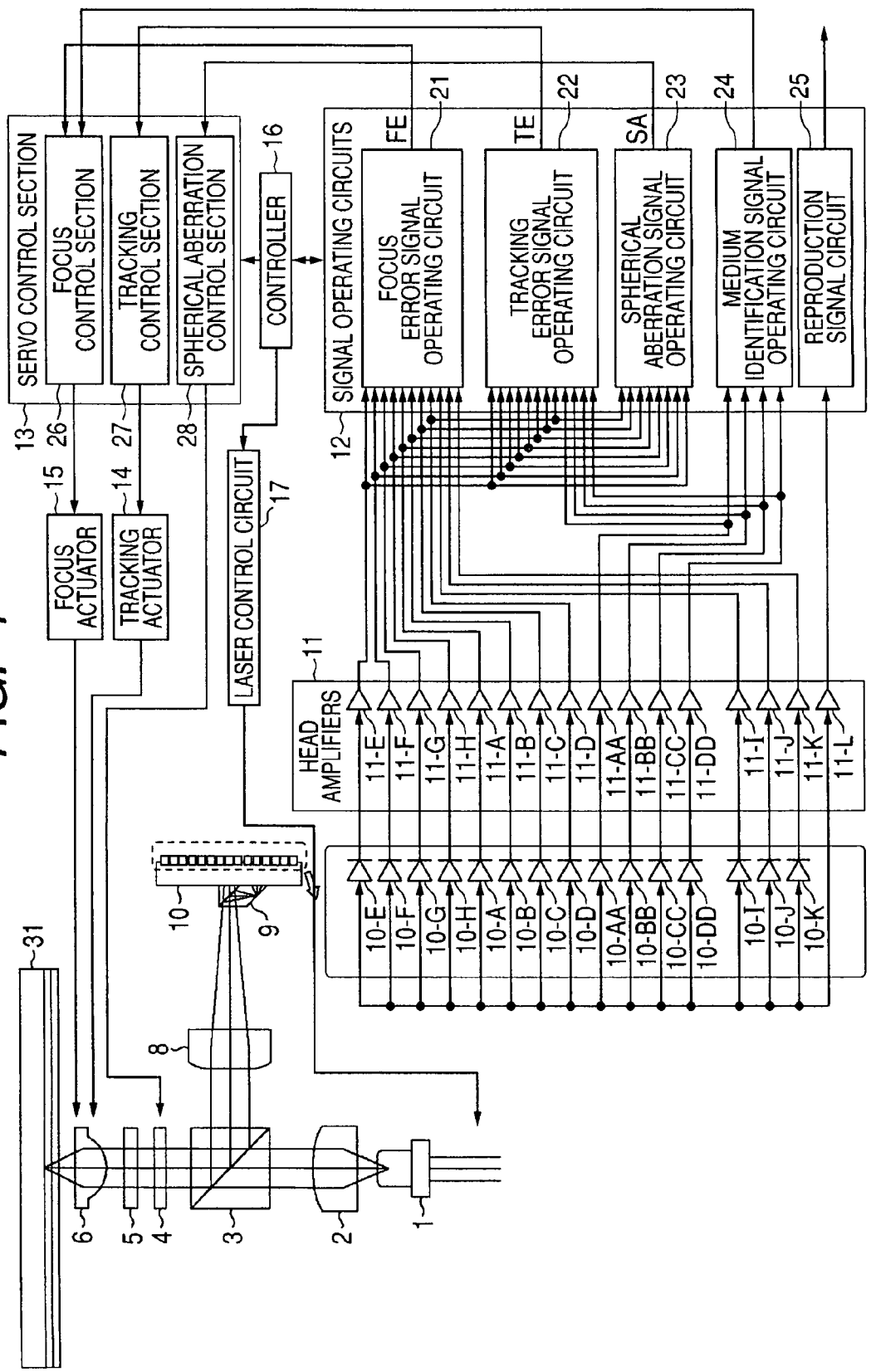
FIG. 1 is a block diagram showing a configuration example of an embodiment of an optical disk drive applying the invention or an optical disk drive implementing a photodetector applying the invention.

Hereinafter, an embodiment of the present invention will now be explained, in which the correspondence between composing elements described in the appended claims and the specific examples in the embodiment of the invention will be exemplified as follows. The following descriptions are for confirming that the specific example supporting the invention described in the appended claims is described in the embodiments of the invention. Therefore, even if any specific examples described in the embodiment of the invention are not described here as what correspond to the composing elements, it dose not mean that such specific examples do not correspond to the composing elements. On the contrary, even if the specific examples are described here as those corresponding to the configuration elements, it does not mean that the specific examples do not correspond to other configuration elements than the above configuration elements.

Further, this description does not mean that inventions corresponding to the specific examples described in the embodiments of the present invention are entirely described in the appended claims. In other words, this description does not negate the inventions corresponding to the specific examples described in the embodiments of the present invention and not described in the appended claims to the present patent application, namely the inventions to be the subject matter of divisional patent applications filed in the future or added by an amendment.

According to an embodiment of the invention, there is provided an optical disk drive. The optical disk drive (e.g., the optical disk drive shown in FIG. 1) is an optical disk drive for performing at least one of recording and reproducing an information signal on and from an optical disk (e.g., an optical disk 31 shown in FIG. 1 having an information recording layer L0 and an information recording layer L1 respectively shown in FIGS. 8 and 9 stacked in sequence) having at least one information recording layers stacked on which the information signal is recorded or can be recorded in a predetermined track configuration, including light condensing means (e.g., an objective lens 6 shown in FIG. 1) for condensing a light beam on the optical disk, first moving means (e.g., a tracking actuator 14 shown in FIG. 1) for moving the light condensing means in a direction perpendicular to a track direction of the optical disk, light detection means (e.g., a photodetector 10 shown in FIG. 1 including at least a focus near side acceptance section 10-1 shown in FIGS. 3 and 4) including a first light acceptance section (e.g., light acceptance areas A through H shown in FIGS. 3 and 4) for receiving a light beam (e.g., a beam spot 35 shown in FIG. 3) obtained as a result of reflection of the light beam, which is condensed on the optical disk by the light condensing means, by one of the at least one information recording layers of the optical disk, and a second light acceptance section (e.g., a light acceptance areas AA through DD shown in FIGS. 3 and 4) for receiving stray light obtained as a result of reflection of the light beam by another of the information recording layers than the one of the information recording layers, tracking error signal generating means (e.g., a tracing error signal operating circuit 22 shown in FIG. 1) for generating a first tracking error signal (e.g., by calculating $\{(a+d)-(b+c)\}-\alpha*\{(e+h)-(f+g)\}$ of a formula 2) representing a relative displacement between the track and the optical beam using an output of the first light acceptance section and correcting the first track error signal (e.g., by subtracting $\beta*\{(aa+dd)-(bb+cc)\}$ of the formula 2) using an output of the second light acceptance section, tracking control means (e.g., a tracking control section 27 shown in FIG. 1) for performing tracking control by driving the first moving means in accordance with the tracking error signal generated and then corrected by the tracking error signal generating means, wherein the light beam from the optical disk to the light detection means has a constant track direction of the optical disk on the light detection means even if the position of the first light acceptance section in an optical axis direction is changed, the second light acceptance section is composed of a disk inner circumferential area (e.g., areas AA and DD shown in FIG. 4) and a disk outer circumferential area (e.g., areas BB and CC shown in FIG. 4) respectively disposed at positions, which are symmetrical about a track direction of the one information recording layer of the light detection means, and where the light beam from the one information recording layer is not accepted while the stray light from the another information recording layer is accepted, the tracking control means performs correction for removing an offset in the first tracking error signal caused by the stray light from the another information recording layer using a difference (e.g., $\{(aa+dd)-(bb+cc)\}$ in the formula 2) between the output of the disk inner circumferential area and the output of the disk outer circumferential area in the second light acceptance section.

Discrimination means (e.g., a medium identification signal operating circuit 24 shown in FIG. 1) for discriminating the number of the information recording layers stacked in the optical disk based on the output of the second light acceptance section, and control means (e.g., a controller 16 shown in FIG. 1) for changing the settings of the light detection means in accordance with the number of the information recording layers discriminated by the discrimination means are further provided.

The discrimination means discriminates (e.g., following a method shown in FIGS. 8 and 9) the number of the information recording layers of the optical disk in accordance with presence or absence and the amount of the stray light from the another information recording layer as an output of the second light acceptance section.

The first light acceptance section is divided in a direction perpendicular to the track direction of the one information recording layer into a first track direction end region as a light acceptance area in one end thereof in the track direction, a second track direction end region as a light acceptance area in the other end thereof in the track direction, and a track direction middle region as a light acceptance area in the middle thereof in the track direction (e.g., divided into corresponding regions shown in FIG. 4), further the track direction middle region is divided into at least two in a direction perpendicular to the track direction, and each of the light acceptance areas is divided into two in a direction parallel to the track direction, resulting in two light acceptance areas (e.g., light acceptance areas E, F shown in FIG. 4) formed in the first track direction end region, two light acceptance areas (e.g., light acceptance areas H, G shown in FIG. 4) formed in the second track direction end region, and at least four light acceptance areas (e.g., light acceptance areas A through D shown in FIG. 4) formed in the track direction middle region.

The tracking error signal generating means further generates a second tracking error signal using a differential phase detection (DPD) method using an output of each of the two light acceptance areas formed in the first track direction end region, the two light acceptance areas formed in the second track direction end region, and the at least four light acceptance areas formed in the track direction middle region (e.g., calculating the formula 3), and the tracking control means further performs the tracking control in accordance with the second tracking error signal instead of the first tracking error signal.

Focus error signal generating means (e.g., a focus error signal operating circuit 21 shown in FIG. 1) for generating a focus error signal by detecting the size of the beam spot on the light detection means is further provided.

According to an embodiment of the invention, there is provided an optical pickup device. The optical pickup device (e.g., a light source 1 through a head amplifier 11 shown in FIG. 1) is a pickup device implemented in an optical disk drive (e.g., an optical disk drive shown in FIG. 1) for performing at least one of recording and reproducing an information signal on and from an optical disk (e.g., an optical disk 31 shown in FIG. 1 having an information recording layer L0 and an information recording layer L1 respectively shown in FIGS. 8 and 9 stacked in sequence) having at least one information recording layers stacked on which the information signal is recorded or can be recorded in a predetermined track configuration, including a first light acceptance section (e.g., the light acceptance areas A through H shown in FIGS. 3 and 4) for accepting a light beam obtained as a result of reflection of the light beam, which is irradiated by the optical disk drive and condensed on the optical disk, by one of the at least one information recording layers of the optical disk, and a second light acceptance section (e.g., light acceptance areas AA through DD shown in FIGS. 3 and 4) for accepting the stray light obtained as a result of reflection of the optical beam by another information recording layer than the one information recording layer, wherein the light beam from the optical disk to the pickup device has a constant track direction of the optical disk on the optical pickup device even if the position of the first light acceptance section in an optical axis direction is changed, and the second light acceptance section is composed of a disk inner circumferential area (e.g., areas AA and DD shown in FIG. 4) and a disk outer circumferential area (e.g., areas BB and CC shown in FIG. 4) respectively disposed at positions, which are symmetrical about a track direction of the one information recording layer of the light detection means, and where the light beam from the one information recording layer is not accepted while the stray light from the another information recording layer is accepted.

Hereinafter, embodiments of the present invention will be described with reference to the accompanying drawings.

FIG. 1 shows a configuration example of an embodiment of the optical disk drive applying the present invention or the optical disk drive including a pickup device applying the present invention, and more accurately a configuration example of an embodiment of the optical system and the servo control system therein.

In the example shown in FIG. 1, the optical system of the optical disk drive is composed of the light source 1 through the photodetector 10.

The light source 1 is driven by a laser control circuit 17 described later and emits a laser beam. The laser beam emitted from the light source 1 becomes a collimated beam through a collimator lens 2, and is transmitted through a polarizing beam splitter 3 and a spherical aberration correction section 4, converted into a circularly-polarized light beam by a quarter wave plate 5, and then reaches the objective lens 6. The objective lens 6 condenses the light beam, which has arrived from the quarter wave plate 5, on the recording surface of the optical disk 31. The light beam reflected by the recording surface of the optical disk 31 is formed as a collimated beam by the objective lens 6, and then transmitted through the quarter wave plate 5 again. As a result, it is converted into a linearly-polarized light beam having 90 degree different polarization direction from the initial light beam, and enters the polarizing beam splitter 3 after transmitted through the spherical aberration correction section 4. The light beam entering the polarizing beam splitter 3 is reflected there, and further reaches the light acceptance surface (light acceptance element) of the photodetector 10 after transmitted through a focusing lens 8 and a prism 9.

As described above, the optical disk drive according to the present embodiment has a feature that the light beam reflected on the recording surface of the optical disk 31 and entering the photodetector 10, namely the returned light beam, is a single spot.

Figure 2:
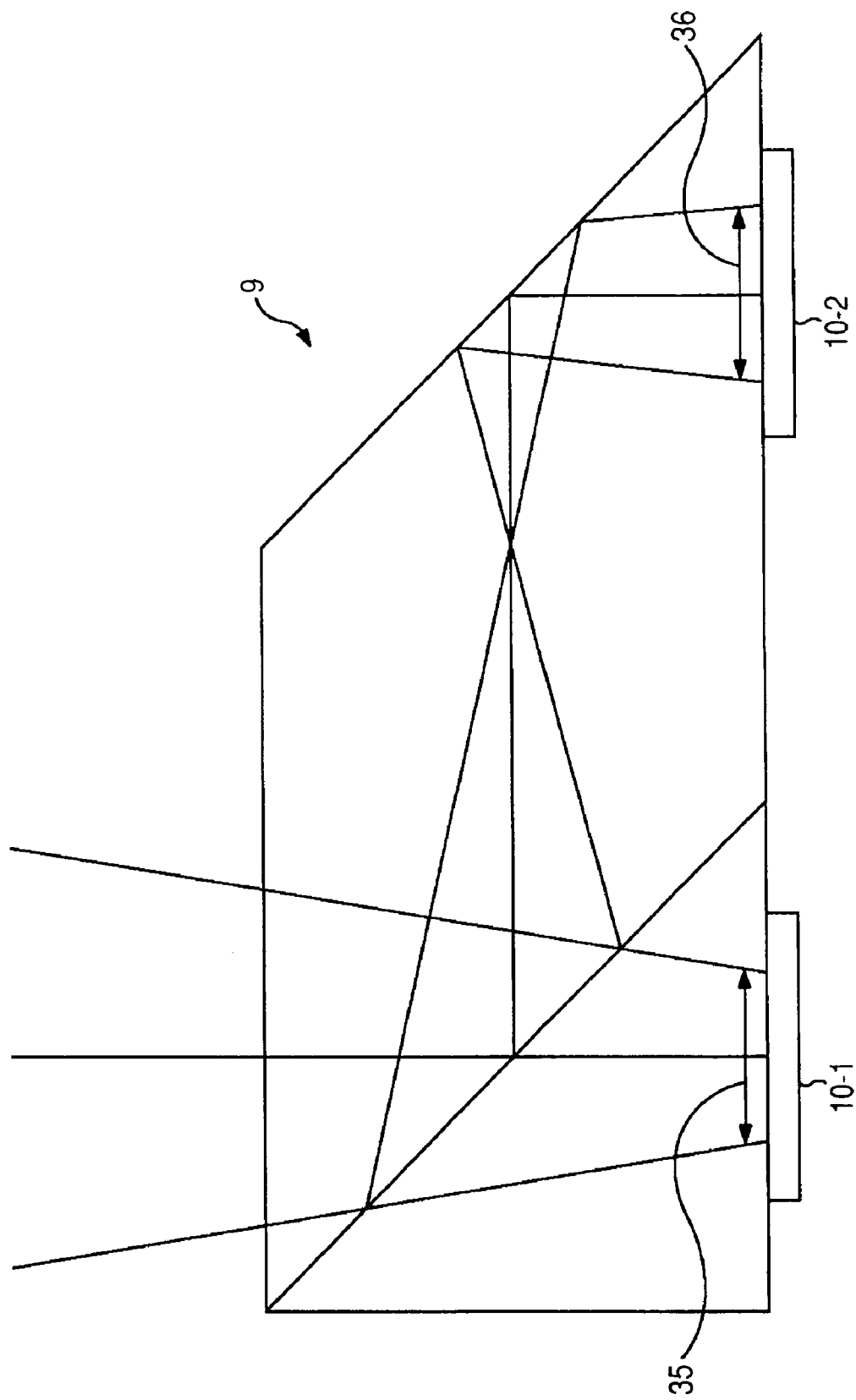
FIG. 2 is an example of a side view of a part of FIG. 1 composed of a prism and a photodetector.
Figure 3:
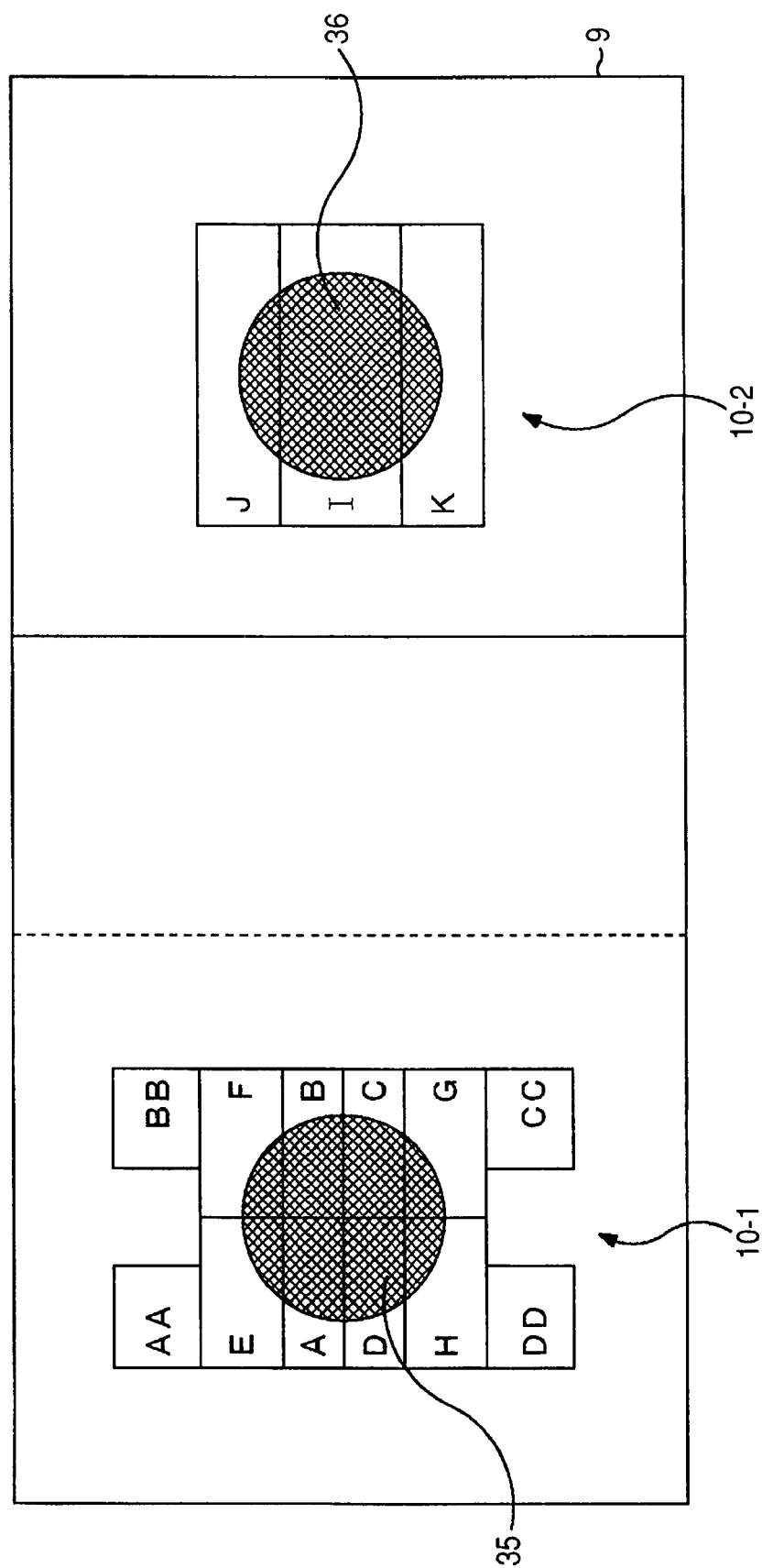
FIG. 3 is an example of a top view of the part of FIG. 1 composed of the prism and the photodetector.

FIGS. 2 and 3 respectively show a side view and a top view of a portion of such an optical system, which is composed of the prism 9 and the photodetector 10.

As shown in FIGS. 2 and 3, the photodetector 10 is provided with two light acceptance sections 10-1, 10-2. Out of the optical beams obtained by bifurcation by the prism 9, a beam spot 35 in the near side of the focus of the focusing lens 8 is accepted by the light acceptance section 10-1, and a beam spot 36 in the far side of the focus of the focusing lens 8 is accepted by the light acceptance section 10-2. Therefore, hereinafter, the light acceptance section 10-1 is referred to as a focus near side acceptance section 10-1, and the light acceptance section 10-2 is referred to as a focus fur side acceptance section 10-2.

Figure 4:
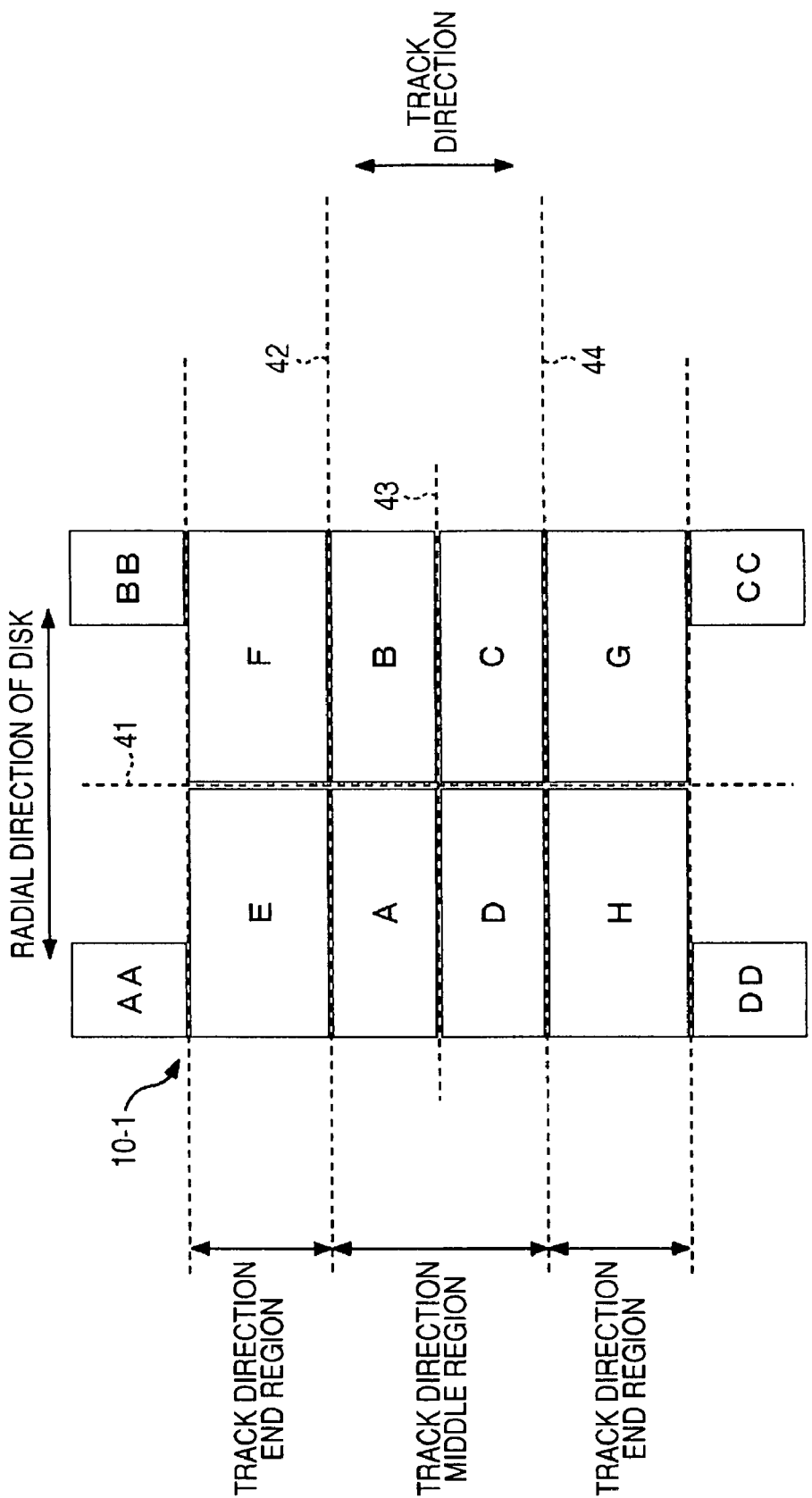
FIG. 4 is a diagram showing an example of a photo acceptance surface of the photodetector applying the invention, and in particular an example of a focus near side acceptance section in the photo acceptance surface of the photodetector shown in FIG. 3.

As shown in FIG. 4, the focus near side acceptance section 10-1 is provided with a light acceptance surface divided into a plurality of light acceptance areas. In other words, FIG. 4 shows an example of the light acceptance surface of the focus near side acceptance section 10-1.

In the example shown in FIG. 4, the surface (hereinafter referred to as a spot acceptance surface) for accepting the beam spot 35 is divided into 8 areas, namely light acceptance areas A through H, by a dividing line 41 substantially parallel to a tangential line direction (hereinafter referred to as a track direction) of the track of the optical disk 31 (FIG. 1), and dividing lines 42 through 44 substantially parallel to a radial direction (hereinafter referred to as a disk radial direction) of the optical disk 31. Therefore, the spot acceptance surface in the focus near side acceptance section 10-1 is composed of the light acceptance areas A through H.

Further, in the case in which the optical disk 31 is formed by stacking a plurality of information recording layers, when a reflected light beam from one information recording layer is accepted by the spot acceptance surface as the beam spot 35, a stray light beam from another information recording layer than the one information recording layer also enters the focus near side acceptance section 10-1. Therefore, in order for accepting such a stray light beam, there are provided light acceptance areas AA, BB, CC, DD (hereinafter described as light acceptance areas AA through DD) in the light acceptance surface of the focus near side acceptance section 10-1.

Hereinafter, the light acceptance areas forming the spot acceptance surface are referred to as spot acceptance areas. Further, the light acceptance areas for accepting the stray light beam are hereinafter referred to as stray light acceptance areas. For example, in the example shown in FIG. 4, the light acceptance areas A through H correspond to the spot acceptance areas, and the light acceptance areas AA through DD correspond to the stray light acceptance areas.

Specifically, in the example shown in FIG. 4, the spot acceptance surface of the focus near side acceptance section 10-1 is divided by the dividing lines 42, 44 in a direction (hereinafter simply referred to as a direction perpendicular to the track direction) substantially perpendicular to the track direction, resulting in three light acceptance areas formed therein. Hereinafter, out of these three light acceptance areas, the central light acceptance area is referred to as a track direction middle region, the both end light acceptance areas are each referred to as a track direction end region. The track direction middle region is further divided into two light acceptance areas by the dividing line 43. Still further, each of the light acceptance areas obtained by dividing the two track direction end regions and the track direction middle region into two in a direction perpendicular to the track direction is divided into two by the dividing line 41 in a direction substantially perpendicular to the disk radial direction, namely in a direction (hereinafter referred to as a direction parallel to the track direction) substantially parallel to the track direction. As a result, in the spot acceptance surface of the focus near side acceptance section 10-1, there are formed eight spot acceptance areas A through H.

However, in the example shown in FIG. 4, the eight spot acceptance areas A through H are defined as follows. That is, in the example shown in FIG. 4, in the case in which the spot acceptance surface of the focus near side acceptance section 10-1 is viewed in the state shown in FIG. 3, namely in the case in which it is viewed from above to below the prism 9, the four light acceptance areas obtained by dividing the track direction middle region are defined as the spot acceptance areas A through D respectively from one at the obliquely upward left end in the clockwise direction. Further, out of the two spot acceptance areas obtained by dividing the track direction end region (the upper one of the track direction end regions shown in FIG. 4) adjacent to the spot acceptance areas A, B, one (the left one in FIG. 4) adjacent to the spot acceptance area A is defined as the spot acceptance area E, while one (the right one in FIG. 4) adjacent to the spot acceptance area B is defined as the spot acceptance area F, respectively. Further, out of the two spot acceptance areas obtained by dividing the track direction end region (the lower one of the track direction end regions shown in FIG. 4) adjacent to the spot acceptance areas C, D, one (the right one in FIG. 4) adjacent to the spot acceptance area C is defined as the spot acceptance area G, while one (the left one in FIG. 4) adjacent to the spot acceptance area D is defined as the spot acceptance area H, respectively.

Further, the stray light acceptance area AA is formed so as to be adjacent to the spot acceptance area E in the track direction, the stray light acceptance area BB is formed so as to be adjacent to the spot acceptance area F in the track direction, the stray light acceptance area CC is formed so as to be adjacent to the spot acceptance area G in the track direction, and the stray light acceptance area DD is formed so as to be adjacent to the spot acceptance area H in the track direction.

In other words, in the example shown in FIG. 4, the four stray light acceptance areas AA through DD are defined as follows. That is, in the example shown in FIG. 4, in the case in which the spot acceptance surface of the focus near side acceptance section 10-1 is viewed in the state shown in FIG. 3, namely in the case it is viewed from above to below the prism 9, the four stray light acceptance areas are disposed so as to surround the spot acceptance surface, and defined as the stray light acceptance areas AA through DD respectively from one at the obliquely upward left end in the clockwise direction.

Figure 5:
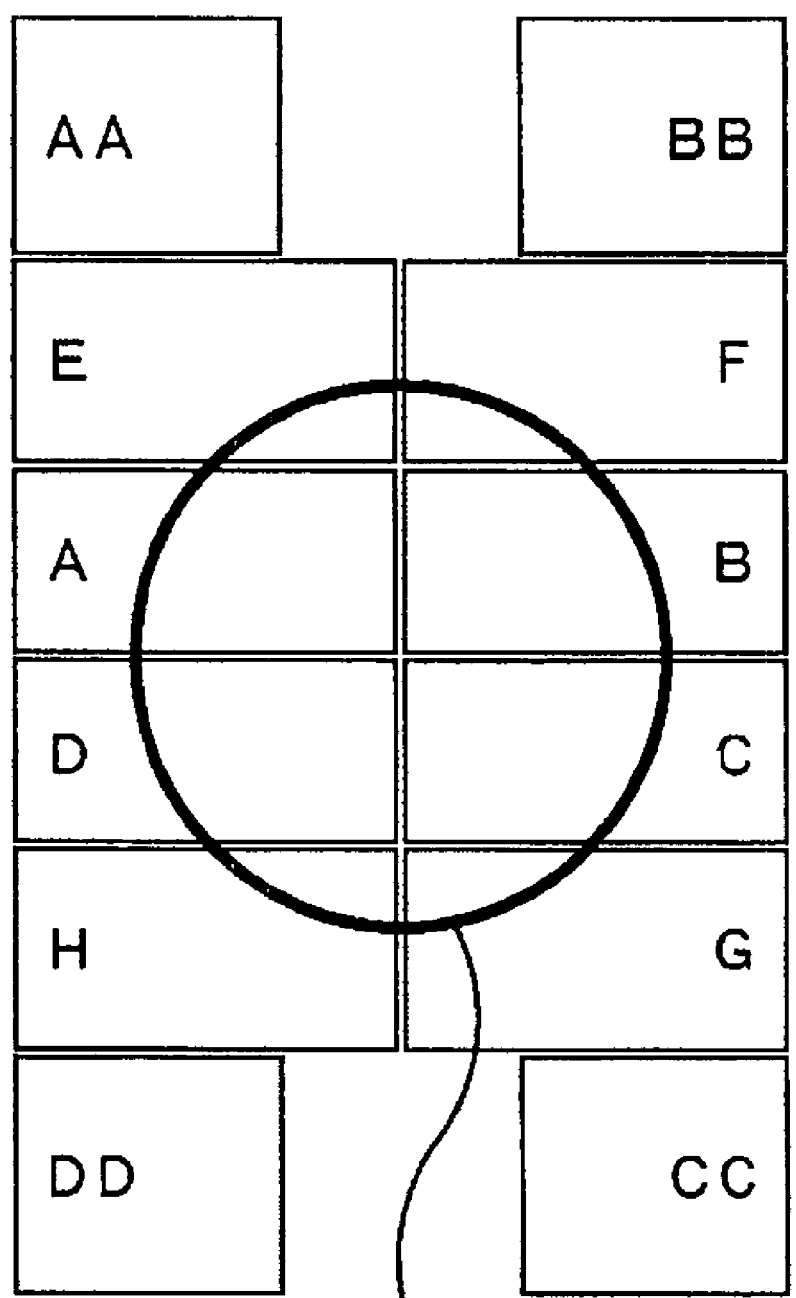
FIG. 5 is a diagram showing an example of a beam spot on the focus near side acceptance surface of the photodetector shown in FIG. 4 in the case in which the optical disk shown in FIG. 1 is not provided with a plurality of signal layers.
Figure 6:
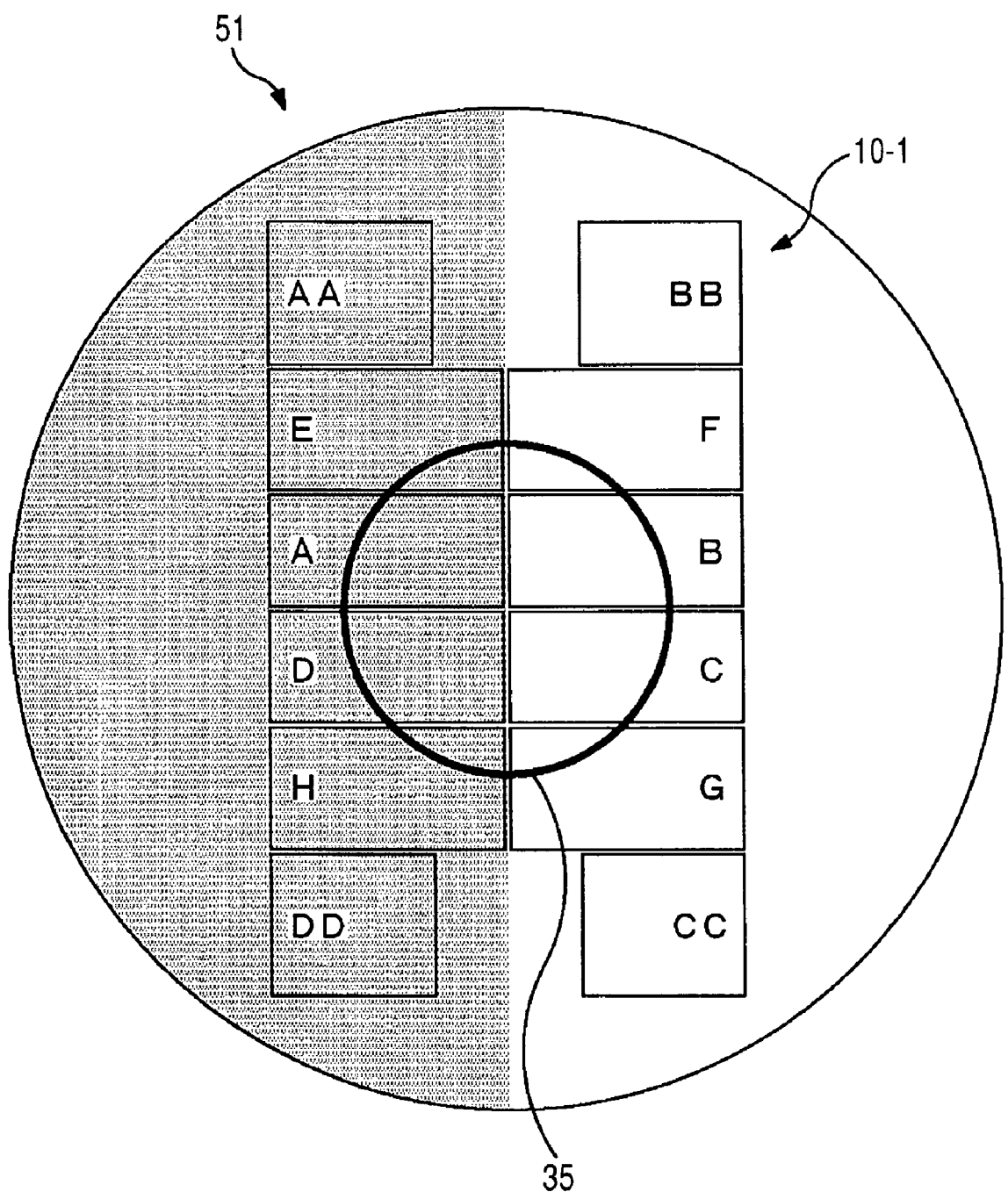
FIG. 6 is a diagram showing an example of a beam spot on the focus near side acceptance surface of the photodetector shown in FIG. 4 in the case in which the optical disk shown in FIG. 1 is provided with a plurality of signal layers and the incident light to the optical disk passes over a boundary between a recorded section and a non-recorded section in the signal layer which is not in the condition of recording or reproducing a signal.

In this case, if the optical disk 31 is not provided with a plurality of signal layers, as shown in FIG. 5, no stray light beam enters the light acceptance surface of the focus near side acceptance section 10-1 of the example shown in FIG. 4, but only the beam spot 35 is accepted. In contrast, if the optical disk 31 is provided with a plurality of signal layers, and when the incident light to the optical disk 31 passes over a boundary between a recorded section and a non-recorded section in a signal layer (the another signal layer, and hereinafter referred to as a stray light layer), which is not in the condition of recording or reproducing a signal, the light acceptance surface of the focus near side acceptance section 10-1 of the example shown in FIG. 4 is assumed to accept a spot 51 (hereinafter referred to as a stray beam spot 51) caused by the stray light beam in addition to the beam spot 35 as shown in FIG. 6.

In the drawing, the gray area in the stray beam spot 51 represents the area corresponding to the reflected light in the recorded section in the stray light layer, while the white area therein represents the area corresponding to the reflected light in the non-recorded section in the stray light layer. Therefore, while the incident light to the optical disk 31 is passing over the boundary between the recorded section and the non-recorded section of the stray light layer, it is assumed that the difference in the amount of stray light in the stray beam spot 51 is caused in accordance with the difference in the reflectance between the recorded section and the non-recorded section thereof. The above fact is illustrated with colors of gray and white in the example shown in FIG. 6.

Therefore, if a push-pull operation is performed utilizing an optical detector in the related art, there is caused a problem that the difference in the amount of the stray light affects the result of the push-pull operation to cause an offset in the push-pull signal.

It should be noted that this problem does not arise with respect to the optical disk drive provided with astigmatism generating means for generating astigmatism in a direction inclined with respect to the track direction of the optical disk in the optical path from the optical disk to the optical detector. In other words, this problem arises with respect to the optical disk drive having the feature that the light beam from the optical disk to the optical detector has a constant track direction of the optical disk on the optical detector even if the position of the light acceptance section of the optical detector in the optical axis direction is varied as one of the features thereof. It is assumed that the optical disk drive of the example shown in FIG. 1 is provided with such a feature.

Therefore, in order for solving the problem, the focus near side acceptance section 10-1 shown in FIG. 4 and so on is provided with the stray light acceptance areas AA through DD so as to accept only the stray light, thus removing the push-pull offset caused by the stray light using the signals from the stray light acceptance areas AA through DD. It should be noted that how the signals from the stray light acceptance areas AA through DD are used will be explained together with explanations for a formula 2 below.

Figure 7:
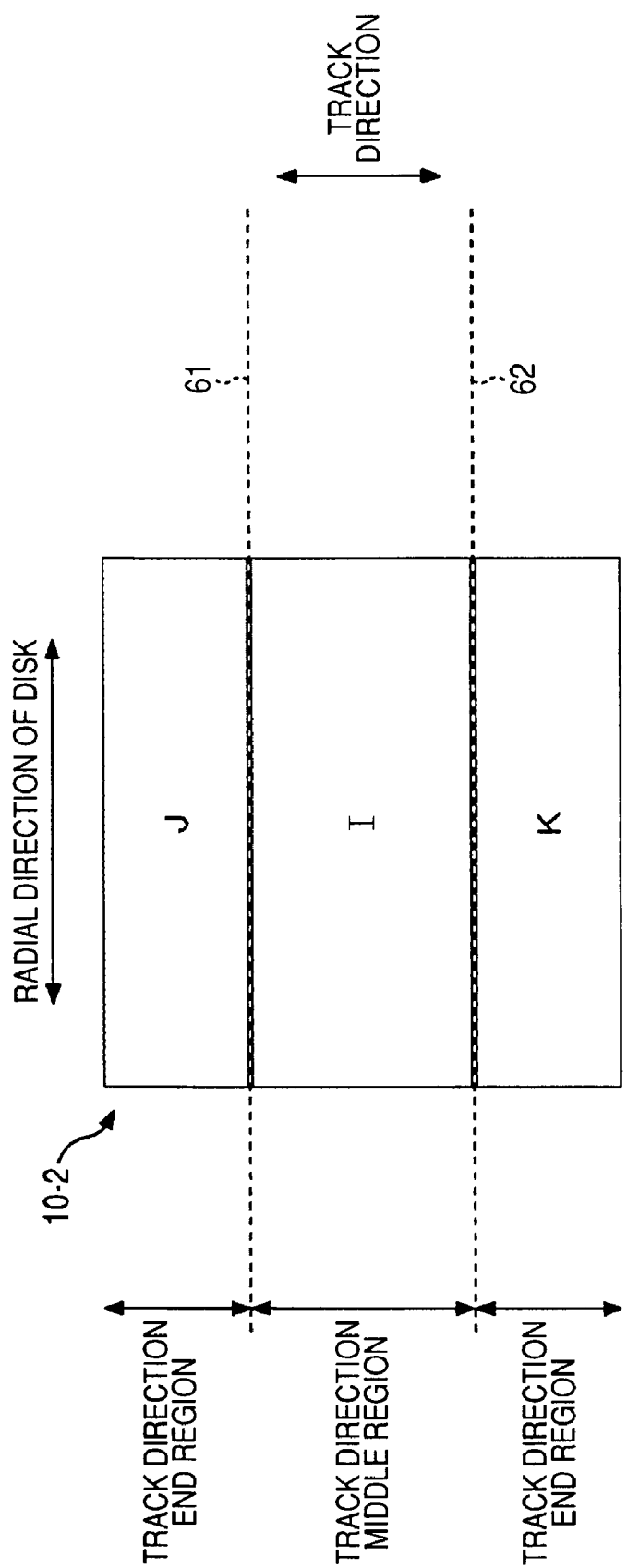
FIG. 7 is a diagram showing an example of a photo acceptance surface of the photodetector applying the invention, and in particular an example of a focus far side acceptance section in the photo acceptance surface of the photodetector shown in FIG. 3.

In contrast to such a light acceptance surface of the focus near side acceptance section 10-1, the light acceptance surface of the focus far side acceptance section 10-2 (FIGS. 2 and 3) becomes as shown in FIG. 7, for example. In other words, FIG. 7 shows an example of the light acceptance surface of the focus far side acceptance section 10-2.

In the example shown in FIG. 7, the light acceptance surface of the focus far side acceptance section 10-2 is divided into three light acceptance areas I through K by dividing lines 61, 62 substantially parallel to the disk radial direction.

Specifically, the light acceptance surface of the focus far side acceptance section 10-2 is provided with three spot acceptance areas, namely the light acceptance area J as the track direction end region, the light acceptance area I as the track direction middle region, and the light acceptance area K as the track direction end region.

The light acceptance areas explained hereinabove using FIGS. 2 through 7, namely the light acceptance areas A through H and AA through DD of the focus near side acceptance section 10-1 and light acceptance areas I through K of the focus far side acceptance section 10-2 are each provided with, for example, a photodiode. Specifically, in the example shown in FIG. 1, for example, eight photodiodes 10-A through 10-H are respectively provided to the eight spot acceptance areas A through H of the focus near side acceptance section 10-1, four photodiodes 10-AA through 10-DD are respectively provided to the four stray light acceptance areas AA through DD of the focus near side acceptance section 10-1, and three photodiodes 10-I through 10-K are respectively provided to the three light acceptance areas I through K of the focus far side acceptance section 10-2.

It should be noted that the number of photodiodes is not limited to that of the example shown in FIG. 1, but is changed accordingly if the number of light acceptance areas of the photodetector 10 is changed. Specifically, if, for example, the light acceptance surface of the photodetector 10 is formed like an example shown in FIG. 13 or 16 described later, twelve photodiodes 10-AI through 10-DI, 10-AO through 10-DO, and 10-E through 10-H are respectively provided to twelve spot acceptance areas AI through DI, AO through DO, and E through H of the focus near side acceptance section 10-1 although not shown in the drawings. Four photodiodes 10-AA through 10-DD are respectively provided to the four stray light acceptance areas AA through DD of the focus near side acceptance section 10-1. Three photodiodes 10-I through 10-K will be respectively provided to the three light acceptance areas I through K of the focus far side acceptance section 10-2. Further, a corresponding number of head amplifiers 11 described later will also be provided.

Each of the photodiodes 10-A through 10-H, 10-AA through 10-DD, and 10-I through 10-K respectively provided to the totally fifteen light acceptance areas A through H, AA through DD, and I through K (e.g., FIG. 3) of the photodetector 10 has a cathode connected to an input terminal of respective one of the head amplifiers 11-A through 11-H, 11-AA through 11-DD, and 11-I through 11-K and an anode commonly connected to an input terminal of a head amplifier 11-L.

Specifically, as described later, output terminals of the head amplifiers 11-A through 11-H are at least connected to a tracking error signal operating circuit 22 for outputting a tracking error signal TE, and the output terminal of the head amplifier 11-L is connected to a reproduction signal circuit 25 for outputting an optical disk reproduction signal. Therefore, the optical disk drive of the example shown in FIG. 1 can output the tracking error signal TE from the side of cathodes of the eight photodiodes 10-A through 10-H and so on, and output the optical disk reproduction signal from the side of anodes of the eight photodiodes 10-A through 10-H and so on.

It should be noted that each of the eight photodiodes 10-A through 10-H and so on can be connected reversely of the example shown in FIG. 1. Specifically, although not shown in the drawings, each of the eight photodiodes 10-A through 10-H and so on can have an anode connected to the input terminal of respective one of the head amplifiers 11 and a cathode commonly connected to the input terminal of the head amplifier 11-L. In the case in which such reverse connections of the example shown in FIG. 1 are formed, the optical disk drive not shown can output the tracking error signal TE from the side of the anodes of the eight photodiodes 10-A through 10-H and so on, and output the optical disk reproduction signal from the side of the cathodes of the eight photodiodes 10-A through 10-H and so on.

As a servo control system for driving the objective lens 6 and the spherical aberration correction section 4 of the optical system as described hereinabove, the head amplifiers 11 through a laser control circuit 17 are provided in the example shown in FIG. 1.

Further, from another viewpoint, the optical disk drive of the example shown in FIG. 1 can be recognized to be configured so as to include a pickup device, as a pickup device applying the present invention, including the light source 1 through the head amplifiers 11, and the signal operating circuit 12 through the laser control circuit 17.

The output signals of the head amplifiers 11 are supplied to the signal operating circuit 12. In the example shown in FIG. 1, the signal operating circuit 12 is provided with the focus error signal operating circuit 21 through the reproduction signal circuit 25.

It should be noted that the output level of the light acceptance area Γ (in the examples shown in FIGS. 1 through 7, Γ denotes either one of the character strings of capital alphabet of A through H, AA through DD, and I through K), more precisely, the output level of the head amplifier 11-Γ is described with a lower-case γ (in the examples shown in FIGS. 1 through 7, γ denotes either one of the character strings of lower-case alphabet of a through h, aa through dd, and i through k).

In the embodiment shown in FIG. 1, for example, a spot size method is applied as the focus error signal FE, and accordingly, the focus error signal operating circuit 21 can perform, for example, the following formula 1 and output the result thereof as the focus error signal FE. Here in the formula 1, κ denotes a coefficient.

$$FE=\{a+b+c+d+\kappa^*(j+k)\}-\{e+f+g+h+\kappa^*i\} \quad (1)$$

The focus error signal FE calculated along the formula 1 is supplied from the focus error signal operating circuit 21 to a focus control section 26 of the servo control section 13 described below.

Further, the tracking error signal operating circuit 22 can calculate and output the tracking error signal TE utilizing a single spot push-pull method (PP) in the case in which a recordable disk is adopted as the optical disk 31, or mainly utilizing a differential phase detection (DPD) method in the case in which a read-only optical disk (ROM) having an information pit string previously formed thereon is adopted as the optical disk 31.

Specifically, in the single spot push-pull method, the tracking error signal TE is calculated along the following formula 2, for example. It should be noted that in the formula 2, the tracking error signal TE is particularly described as TE–PP in order for indicating that it is calculated using the single spot push-pull method.

$$TE-PP=\{(a+d)-(b+c)\}-\alpha^*\{(e+h)-(f+g)\}-\beta^*\{(aa+dd)-(bb+cc)\} \quad (2)$$

Here in the formula 2, α, β each denote a coefficient.

In the formula 2, the operation of $\{(a+d)-(b+c)\}$ corresponds to detection of the push-pull component (a relative displacement between the track and the light beam), and the operation of $\alpha^*\{(e+h)-(f+g)\}$ corresponds to detection of the lens movement component (a relative displacement of the beam spot on the light acceptance element). In other words, by subtracting the operation result of $\alpha^*\{(e+h)-(f+g)\}$ from the operation result of $\{(a+d)-(b+c)\}$, the lens movement component can be removed from the push-pull component.

Further, the operation of $\beta^*\{(aa+dd)-(bb+cc)\}$ is an operation of the correction amount for correcting the unevenness in the intensity of the stray light. In other words, by subtracting the operation result of $\beta^*\{(aa+dd)-(bb+cc)\}$ from the operation result of $\{(a+d)-(b+c)\}-\alpha^*\{(e+h)-(f+g)\}$, the push-pull offset caused by the stray light can be removed.

It should be noted here that the push-pull offset caused by the stray light denotes the offset caused by the difference (difference between the gray area and the white area shown in FIG. 6) in the amount of stray light derived from the difference in the reflectance between the recorded section and the non-recorded section while the incident light to the optical disk 31 is passing on the boundary section between the recorded section and the non-recorded section in the stray light layer as described above using FIG. 6.

In other words, the alignment positions of the stray light acceptance areas AA through DD are not limited to the alignment positions shown in FIG. 6 and so on but can be any positions where the operation of $\beta^*\{(aa+dd)-(bb+cc)\}$ can be performed. Specifically, for example, it is sufficient that the stray light acceptance areas AA, DD are disposed any positions inside the gray area in the stray beam spot 51 shown in FIG. 6, and it is sufficient that the stray light acceptance areas BB, CC are disposed any positions inside the white area in the stray beam spot 51 shown in FIG. 6.

Further, since the correction amount can be controlled by β, the number of the stray light acceptance areas disposed inside the gray area in the stray beam spot 51 shown in FIG. 6 is not limited to two as is the case shown in FIG. 6, but can be any numbers such as one, three, or more. Similarly, the number of the stray light acceptance areas disposed inside the white area in the stray beam spot 51 shown in FIG. 6 is not limited to two as is the case shown in FIG. 6, but can be any numbers such as one, three, or more.

Further, the stray light acceptance areas (the stray light acceptance areas AA through DD in the example shown in FIG. 6) can be disposed on the same surface as the spot acceptance areas (the spot acceptance areas A through H in the example shown in FIG. 6), or can be disposed on a surface having a step with each other.

As a summary of the contents described hereinabove, the focus near side acceptance section 10-1 is composed of the spot acceptance surface and the light acceptance surface (hereinafter referred to as a stray light acceptance surface) for accepting the stray light. For example, in the example shown in FIG. 6, the spot acceptance areas A through H correspond to the spot acceptance surface, and the stray light acceptance areas AA through DD correspond to the stray light acceptance surface.

Further, the spot acceptance surface is composed of disk inner circumferential side areas and disk outer circumferential side areas respectively disposed at positions in the photodetector 10, which are symmetrical about the track in one of the information recording layers (the layer subject to recording/reproducing), and where the stray light (the stray beam spot 51 in the example shown in FIG. 6) from the stray light layer can be accepted without accepting the light beam (the beam spot 35 in the example shown in FIG. 6) from the one of the information recording layers. In other words, if the stray beam spot 51 shown in FIG. 6 is accepted, it is sufficient for the disk inner circumferential side areas and the disk outer circumferential side areas to be respectively formed in the gray area and the white area symmetrically to each other. In the example shown in FIG. 6 and so on, there are formed the stray light acceptance areas AA, DD as such disk inner circumferential side areas and the stray light acceptance areas BB, CC as such disk outer circumferential side areas.

As described hereinabove, the tracking error signal TE-PP obtained by the formula 2, in which the lens movement component and the push-pull offset caused by the stray light are removed from the push-pull component, becomes a stable tracking error signal without offset as a result.

Further, in the differential phase detection method, the tracking error signal TE is calculated along the following formula 3, for example. It should be noted that in the formula 3, the tracking error signal TE is particularly described as TE-DPD in order for indicating that it is calculated using the differential phase detection method. Here in the following formula 3, an operator φ represents a signal phase.

$$TE\text{-}DPD = \phi(a+c+e+g) - \phi(b+d+f+h) \quad (3)$$

Going back to FIG. 1, the tracking error signal operating circuit 22 can perform the operation of the formula 2 or the formula 3 described above to output the operation result as the tracking error signal TE.

The spherical aberration signal operating circuit 23 can calculate a second focus error signal FE2 (a focus error signal FE2 in the outer circumferential part of the beam spot 35 shown in FIG. 3 and so on) in accordance with a following formula 4, for example, or calculate a third focus error signal FE3 (a focus error signal FE3 in the inner circumferential part of the beam spot 35) in accordance with a following formula 5, for example, to output either one of the two focus error signals FE2, FE3, namely FE2 for example, as the spherical aberration signal SA.

$$FE2 = (e+g) - (f+h) \quad (4)$$

$$FE3 = (a+c) - (b+d) \quad (5)$$

$$SA = FE2 \quad (6)$$

The spherical aberration signal SA calculated along the formulas 4 through 6 is supplied from the spherical aberration operating circuit 23 to a spherical aberration control section 26 of the servo control section 13 described later.

The medium identification signal operating circuit 24 discriminates the type of the optical disk 31 based on the intensity and the distribution of the stray light, namely in accordance with each of the output signals aa through dd of the respective stray light acceptance areas AA through DD, and provides the discrimination result to the focus control section 26. It should be noted that the detailed operation of the medium identification signal operating circuit 24 will be described later with reference to FIGS. 8 and 9.

The reproduction signal circuit 25 generates the optical disk reproduction signal based on the output signal (the output levels of the anode side of the photodiodes 10-A through 10-H, 10-AA through 10-DD, and 10-I through 10-K) of the head amplifier 11-L and then outputs it.

The servo control section 13 is composed of the focus control section 26 through the spherical aberration control section 28 in the example shown in FIG. 1.

The focus control section 26 drives a focus actuator 15 in accordance with the focus error signal FE supplied from the focus error signal operating circuit 21, thereby performing the focus control (the control for moving the objective lens 6 in the direction perpendicular to the recording surface of the optical disk 31, namely the focusing direction). In other words, the focus actuator 15 is driven by the focus control section 26 and moves the objective lens 6 in the focusing direction. In this case, the focus control corresponding to the type of the optical disk 31 is performed, the type of the optical disk 31 being discriminated in accordance with the output signal of the medium identification signal operating circuit 24.

The tracking control section 27 drives the tracking actuator 14 in accordance with the tracking error signal TE supplied from the tracking error operating circuit 22, thereby performing the tracking control (the control for moving the objective lens 6 in a direction perpendicular to the track direction). In other words, the tracking actuator 14 is driven by the tracking control section 27 and moves the objective lens 6 in the direction perpendicular to the track direction.

In accordance with the spherical aberration signal SA supplied from the spherical aberration signal operating circuit 23, the spherical aberration control section 28 performs the correction control of the spherical aberration correction section 4 for correcting the spherical aberration caused when the light beam is condensed on the recording surface of the optical disk 31 by the objective lens 6.

Specifically, for example, in a focused condition with small spherical aberration of the irradiated light beam on the optical disk 31, the intensity of the beam spot 35 formed on the light acceptance surface of the photodetector 10 becomes substantially even throughout the entire surface. Therefore, as shown in the formulas 4 through 6 described above, both of the two focus error signals FE2, FE3 become nearly zero, and as a result, the spherical aberration signal SA also becomes nearly zero. In such a case, the spherical aberration control section 28 inhibits the correction control of the spherical aberration correction section 4.

On the other hand, if the spherical aberration is caused in the irradiated light on the optical disk 31, the beam spot 35 formed on the light acceptance surface of the photodetector 10 has a intensity distribution different between the inner circumferential part and the outer circumferential part, and as a result, the two focus error signals FE2, FE3 have different value from each other. Therefore, the spherical aberration signal SA becomes to have a certain value other than zero, thus the spherical aberration can be detected from the spherical aberration signal SA having the value other than zero. Therefore, in such a case, the spherical aberration control section 26 performs the correction control of the spherical aberration correction section 4 based on the detection result.

The controller 16 controls the overall operations of the optical disk drive, namely controls operations of, for example, the signal operating circuit 12, the servo control circuit 13, the laser control circuit 17, and further a spindle motor not shown and so on. It should be noted that the controller 16 obtains the output signals of the signal operating circuit 12 if necessary and uses the signals for controlling the circuit. For example, the controller 16 recognizes the number of information recording layers stacked in the optical disk 31 from the output signal of the medium identification signal operating circuit 24, and changes the settings of the photodetector 10 in accordance with the number of information recording layers, and further, controls the laser control circuit 17 to optimize the intensity of the light irradiating the optical disk 31 in accordance with the number of information recording layers stacked in the optical disk 31. Thus, the laser control circuit 17 drives the light source 1 based on the control of the controller 16 to emit the laser beam.

Hereinabove, the configuration of the optical disk drive of the example shown in FIG. 1 is explained. It should be noted that each of the operations of the optical disk drive seems to be easily understood by referring to the explanations presented hereinabove, and accordingly, the explanations for the operations will be omitted here.

However, the operation of the medium identification signal operating circuit 24, namely the discrimination operation of the type of the optical disk 31, will hereinafter be explained.

In the case in which the optical disk 31 is composed of a plurality of information recording layers stacked one another, the formation range of the stray light formed on the light acceptance surface of the focus near side acceptance section 10-1, the range of the circle composed of the gray area and the white area of the stray beam spot 51 in the example shown in FIG. 6, for example, becomes gradually wider from the layer adjacent to the focal point of the objective lens 6 to the layer distant from the focal point thereof. Therefore, by changing the formation position of the stray light detection area on the focus near side acceptance section 10-1 depending on from which layers the stray light is detected, these can be detected individually.

In the example described above, the stray light acceptance areas AA through DD shown in FIG. 4 can directly adopted as such stray light detection areas.

In this case, the medium identification signal operating circuit 24 can discriminate whether the optical disk 31 is a type of having two or more information recording layers stacked one another or a type formed of a single information recording layer by utilizing the output signals aa through dd of the stray light acceptance areas AA through DD.

Hereinafter, an example of the discrimination method will be explained with reference to FIGS. 8 and 9.

Figure 8:
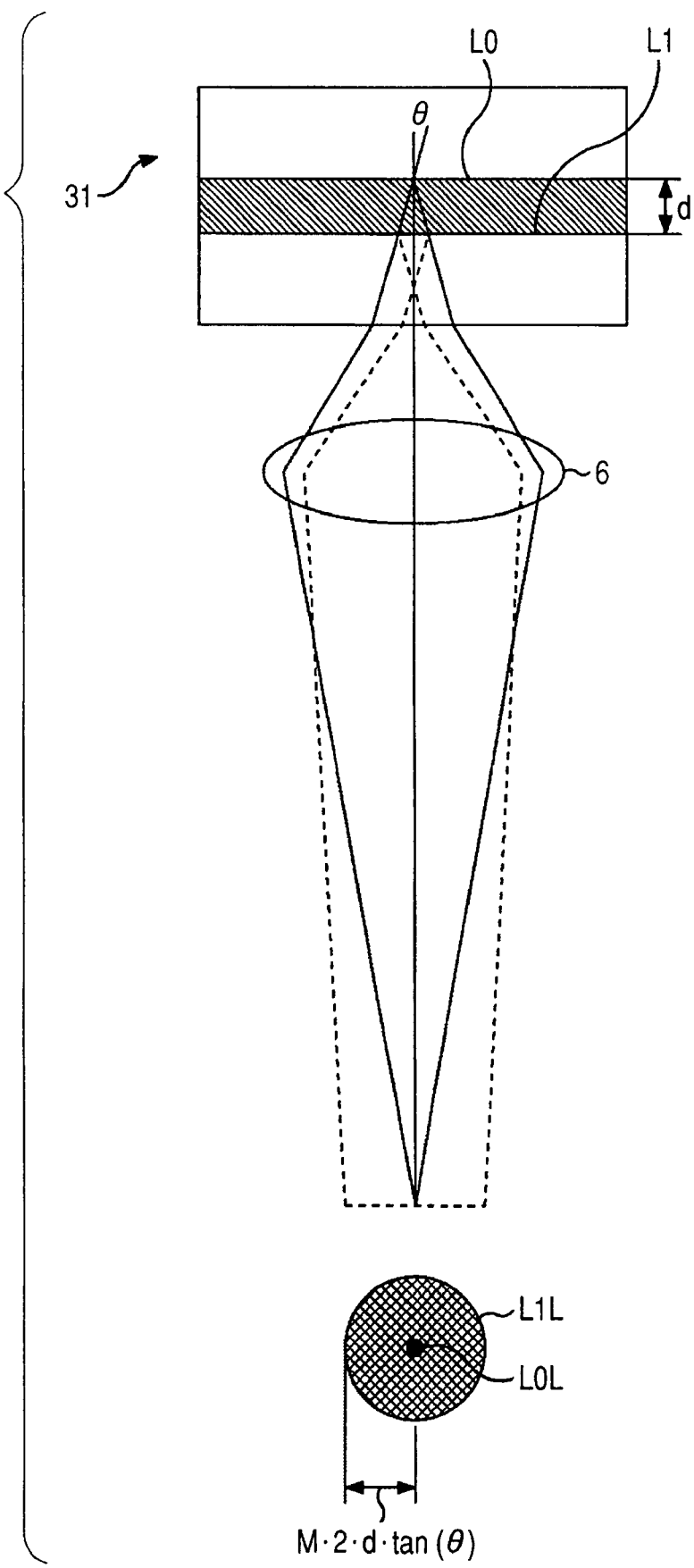
FIG. 8 is a diagram for explaining an operational example of a medium identification signal operating circuit shown in FIG. 1.
Figure 9:
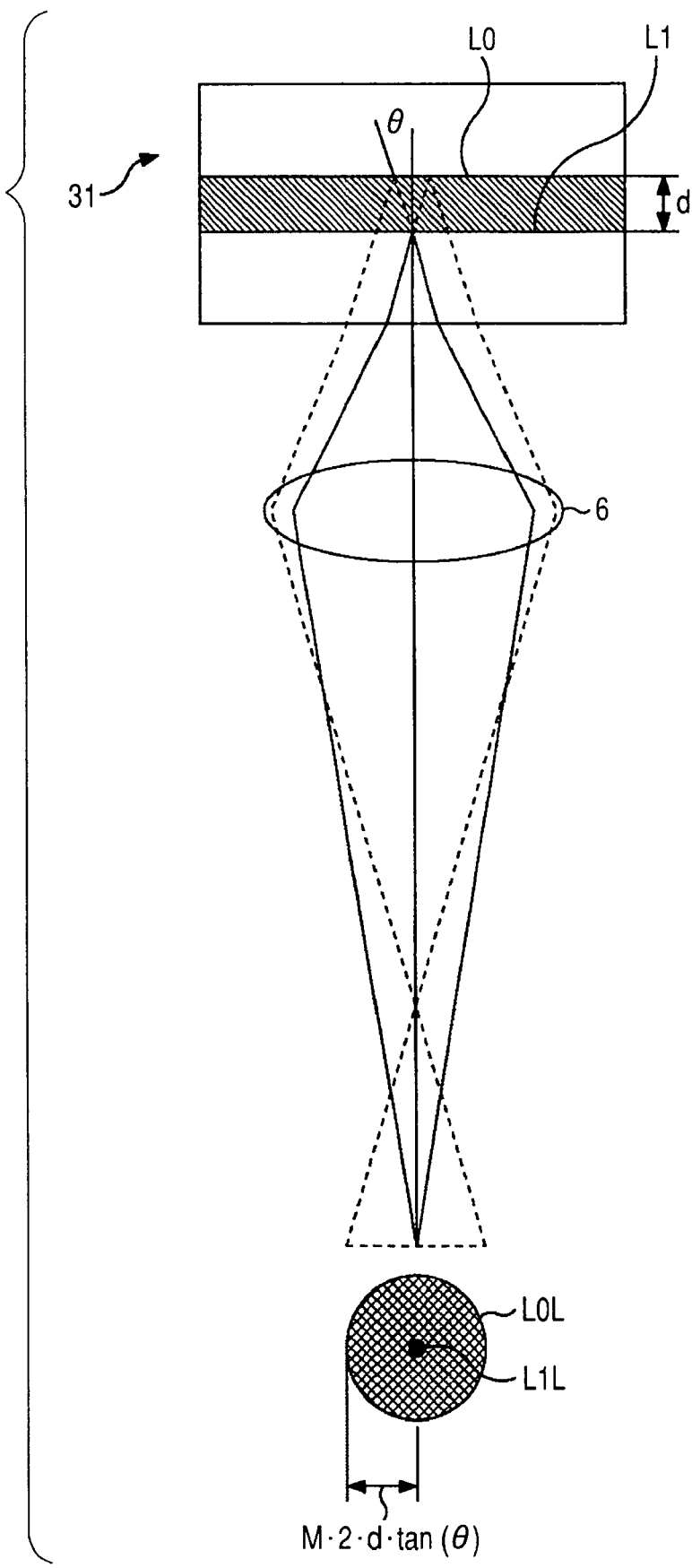
FIG. 9 is a diagram for explaining an operational example of the medium identification signal operating circuit shown in FIG. 1.

FIGS. 8 and 9 show the condition in which the optical disk 31 having two layers of the information recording layer L0 and the information recording layer L1 stacked in sequence is irradiated with a light beam.

As shown in FIG. 8, if the focal point of the light beam by the objective lens 6 is aligned on the information recording layer L0, a part of the light beam is reflected by the information recording layer L1. The reflected light beam becomes the stray light beam, and is led to the focus near side acceptance section 10-1 passing through the path illustrated with the dotted line. As a result, on the focus near side acceptance section 10-1 there are formed an L0 layer light beam L0L caused by the returned light reflected by the information recording layer L0 and an L1 layer stray beam spot L1L caused by the stray light. In this case, the L0 layer light beam L0L corresponds to the beam spot 35 of the example shown in FIG. 6, and the L1 layer stray beam spot L1L corresponds to the stray beam spot 51 of the example shown in FIG. 6.

Further, as shown in FIG. 9, if the focal point of the light beam by the objective lens 6 is aligned on the information recording surface L1, a part of the light beam reaches the information recording layer L0, and is reflected there to become the stray light. The stray light beam is led to the focus near side acceptance section 10-1 passing through the path illustrated with the dotted line. As a result, on the focus near side acceptance section 10-1 there are formed an L1 layer light beam L1L caused by the returned light reflected by the information recording layer L1 and an L0 layer stray beam spot L0L caused by the stray light. In this case, the L1 layer light beam L1L corresponds to the beam spot 35 of the example shown in FIG. 6, and the L0 layer stray beam spot L0L corresponds to the stray beam spot 51 of the example shown in FIG. 6.

As described above, if the optical disk 31 having two or more information recording layers stacked one another is irradiated with a light beam, the stray beam spot is formed on the focus near side acceptance section 10-1 irrespective of on which one of the information recording layers the focal point of the light beam is aligned.

In other words, if the optical disk 31 formed only of a single information recording layer is irradiated with the light beam, no stray light is caused as is obvious from FIGS. 8 and 9. Therefore, no stray beam spot is formed on the focus near side acceptance section 10-1.

Therefore, if the optical disk 31 having two or more information recording layers stacked one another is irradiated with the light beam, the output signals aa through dd are output respectively from the stray light acceptance areas AA through DD irradiated with the stray beam spot. On the contrary, if the optical disk 31 formed of a single information recording layer is irradiated with the light beam, the output signals aa through dd are not output from the stray light acceptance areas AA through DD by the stray beam spot.

Therefore, the medium identification signal operating circuit 24 can discriminate the type of the optical disk 31 as the type with two or more information recording layers stacked one another if it is recognized that the output signals aa through dd of the respective stray light acceptance areas AA through DD are input. On the other hand, the medium identification signal operating circuit 24 can discriminate the type of the optical disk 31 as the type formed of a single information recording layer if it is recognized that the output signals aa through dd of the respective stray light acceptance areas AA through DD are not input.

Further, although not shown in the drawings, the stray light acceptance areas AA through DD can be formed to be disposed inside the stray beam spot formed by the stray light from the either information recording layer. Thus, irrespective of on which one of the information recording layers in the optical disk 31 the focal point of the light beam is aligned, the stray light from other information layers can always be detected.

It should be noted that the inventor of the present invention has already invented the discrimination method of the type of the optical disk 31, which has been disclosed in detail in, for example, JP-A-2006-31773, and it is possible to adopt such measures.

Hereinabove, as the optical disk drive to which the present invention is applied, the optical disk drive having the configuration shown in FIG. 1 has been described.

It should be noted, however, that the embodiment of the optical disk drive to which the present invention is applied is not limited to the example shown in FIG. 1, but various embodiments can be taken.

Figure 10:
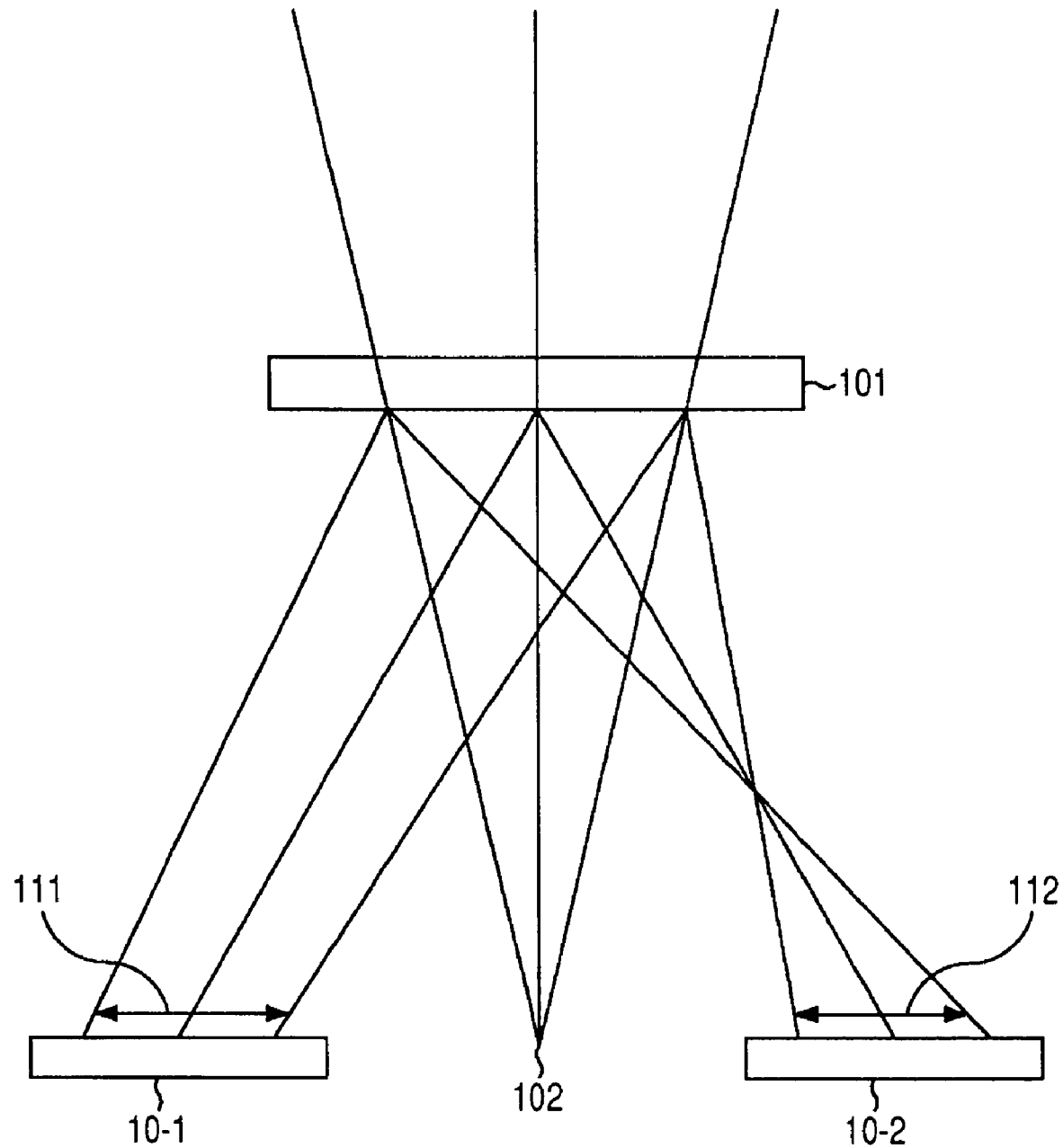
FIG. 10 is an example of a side view of a part of FIG. 1 composed of a hologram element and a photodetector in the case in which the hologram element is provided instead of the prism.
Figure 11:
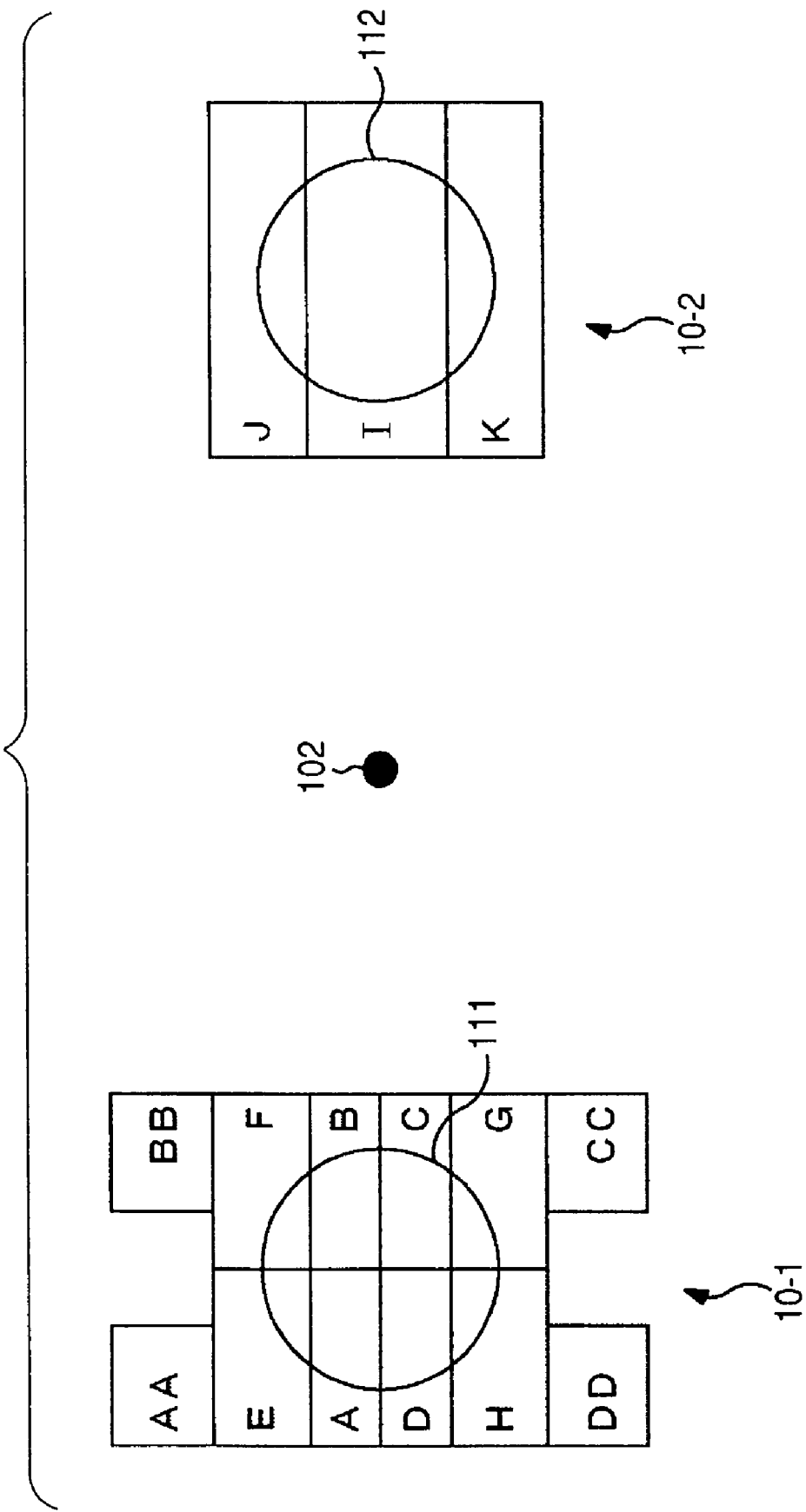
FIG. 11 is an example of a top view of the part of FIG. 1 composed of the hologram element and the photodetector in the case in which the hologram element is provided instead of the prism.

For example, an optical disk drive implementing a hologram element 101 as shown in FIGS. 10 and 11 instead of the prism 9 shown in FIG. 1 can also be an embodiment of the optical disk drive to which the present invention is applied. It should also be noted that a point 102 denotes zeroth order diffracted light in FIGS. 10 and 11.

The hologram element 101 has a lens effect and a light beam diffraction effect. Therefore, a beam spot 111 of a positive first order diffracted light diffracted by the hologram element 101 is accepted by the light acceptance section adopted as the focus near side acceptance section 10-1 in the example shown in FIG. 1. Further, a beam spot 112 of a negative first order diffracted light diffracted by the hologram element 101 is accepted by the light acceptance section adopted as the focus far side acceptance section 10-2 in the example shown in FIG. 1. Thus, the similar operations to the optical disk drive of the example shown in FIG. 1 can be performed.

Figure 12:
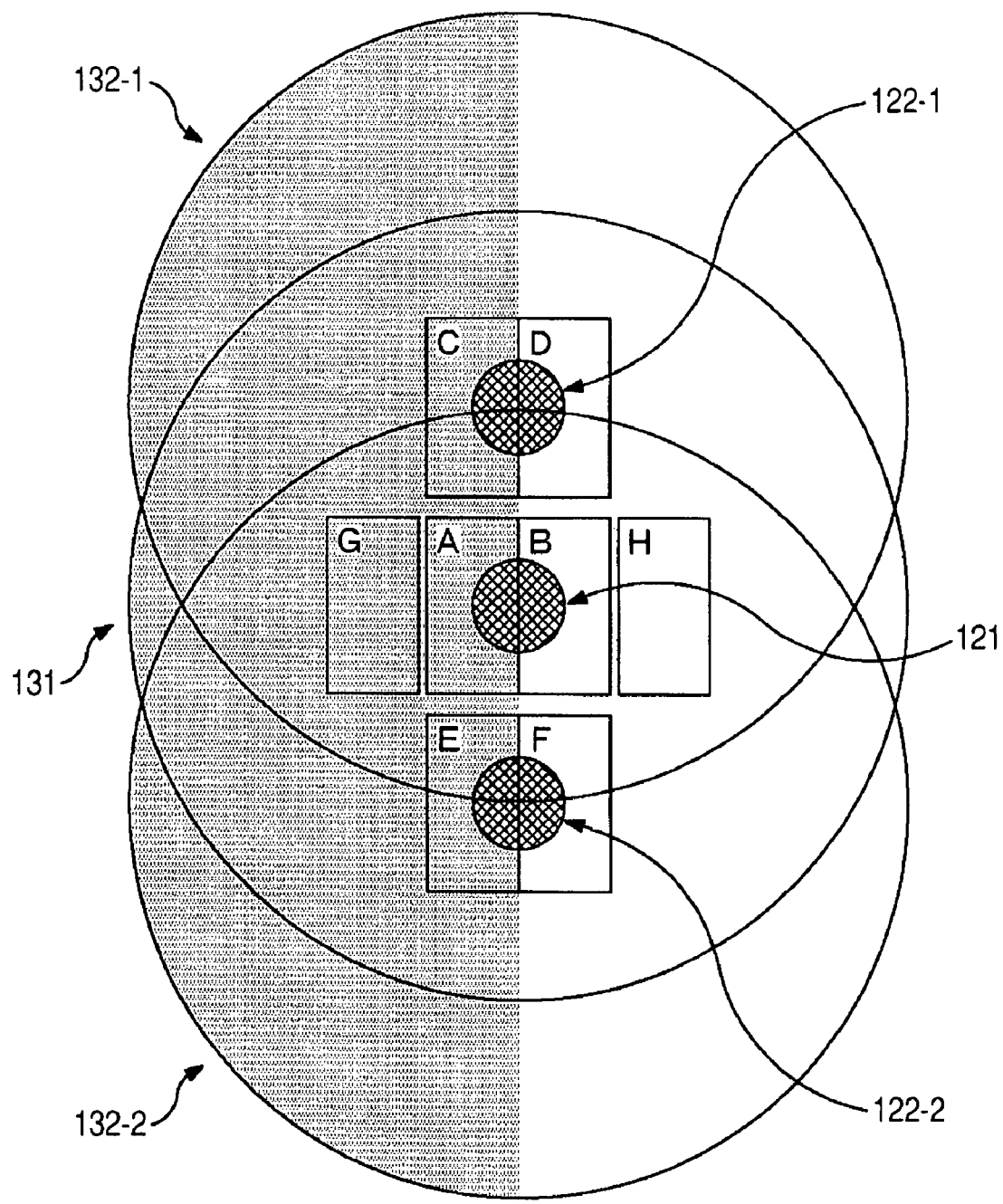
FIG. 12 is a diagram showing an example of the condition in which the optical disk shown in FIG. 1 is provided with two signal layers and the incident light to the optical disk passes over a boundary between a recorded section and a non-recorded section in astray light layer in the case in which the invention is applied to an optical disk drive implementing a DPP method.

Further, the present invention can be applicable to an optical disk drive implementing a differential push-pull (DPP) method, for example. In this case, the light acceptance surface of the photodetector 10 can be composed, for example, of the light acceptance areas A through H shown in FIG. 12. Therefore, the optical disk drive having the photodetector 10 composed of the light acceptance areas A through H formed as shown in FIG. 12 is also an embodiment of the optical disk drive to which the invention can be applied. It should be noted that in this case, although not shown in the drawings, as described above, the photodiodes of the photodetector 10 and the subsequent head amplifiers 11 are provided corresponding respectively to the light acceptance areas A through H.

FIG. 12 shows the condition in which the optical disk 31 is provided with two signal layers and the incident light to the optical disk 31 passes over a boundary between a recorded section and a non-recorded section in a stray light layer.

In FIG. 12, the spot 121 accepted by the light acceptance areas A, B represents the main spot. In other words, the light acceptance areas A, B are areas for accepting the main spot 121.

Further, a spot 131 represents a stray beam spot corresponding to the main spot. The separation of the gray area and the white area of the spot 131 is similar to the separation in the example shown in FIG. 6. In other words, the light acceptance area G provided in the gray area of the stray beam spot 131 is provided for accepting the stray light corresponding to the reflected light in the recorded section in the stray light layer. In contrast, the light acceptance area H provided in the white area of the stray beam spot 131 is provided for accepting the stray light corresponding to the reflected light in the non-recorded section in the stray light layer.

A spot 122-1 accepted by the light acceptance areas C, D represents a first side spot. In other words, the light acceptance areas C, D are areas for accepting the first side spot 122-1. Further, a spot 132-1 represents a stray beam spot corresponding to the first side spot.

Still further, a spot 122-2 accepted by the light acceptance areas E, F represents a second side spot. In other words, the light acceptance areas E, F are areas for accepting the second side spot 122-2. Further, a spot 132-2 represents a stray beam spot corresponding to the second side spot.

In this case, the tracking error signal operating circuit 22 (FIG. 1), which is provided with the output signal a through h of the light acceptance areas A through H input via the head amplifiers 11, can calculate the tracking error signal TE along, for example, a following formula 7. It should be noted that in the formula 7, the tracking error signal TE is particularly described as TE-DPP in order for indicating that it is calculated using the DPP method. Here in the formula 7, $\delta$ and $\eta$ denote coefficients.

$$TE\text{-}DPP = (a-b) - \delta * \{(c-d)+(e-f)\} - \eta * (g-h) \qquad (7)$$

Therefore, even in the DPP detection method as shown in FIG. 12, for example, there is caused a problem that according to the DPP operation used in the related art, the DPP includes an offset under the influence of differences in transmittance and reflectance between the recorded section and the non-recorded section in the stray light layer. Therefore, by performing the operation of the formula 7 in order for solving such a problem, it becomes possible to obtain the DPP tracking error signal TE-DPP from which the offset caused by the stray light has been removed.

Figure 13:
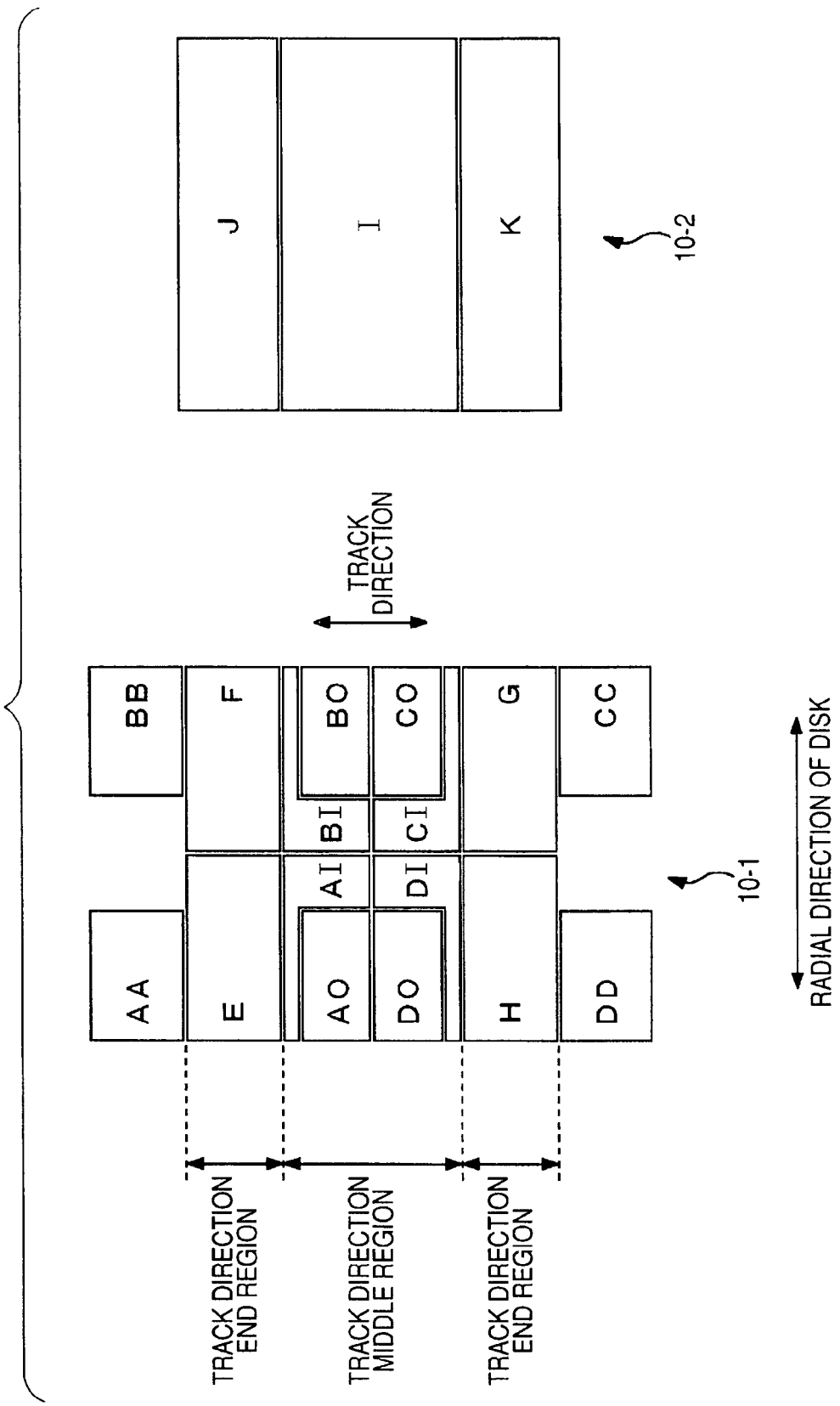
FIG. 13 is a diagram showing an example of a photo acceptance surface of the photodetector applying the invention, and in particular another example of a focus near side acceptance section in the photo acceptance surface of the photodetector shown in FIG. 3 than shown in FIG. 4.
Figure 14:
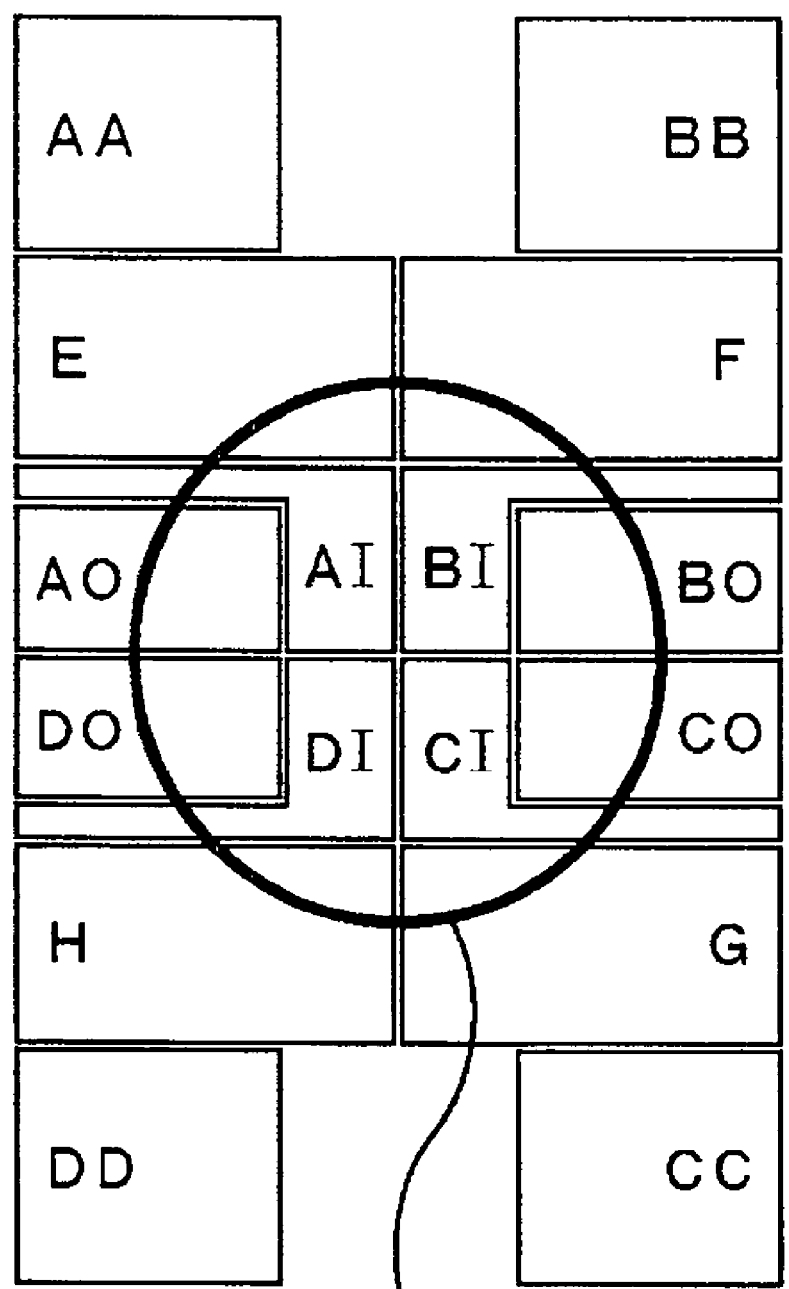
FIG. 14 is a diagram showing an example of a beam spot on the focus near side acceptance surface of the photodetector shown in FIG. 13 in the case in which the optical disk shown in FIG. 1 is not provided with a plurality of signal layers.

Further, an optical disk drive implementing the focus near side acceptance section 10-1 shown in FIG. 13 instead of the focus near side acceptance section 10-1 shown in FIG. 3 and so on is also an embodiment of the optical disk drive to which the present invention is applied. Regarding the focus far side acceptance section 10-2, the same as shown in FIG. 3 and so on is implemented. It should be noted that FIG. 14 is a drawing corresponding to FIG. 5, and shows an example of a beam spot on the focus near side acceptance section 10-1 shown in FIG. 13 in the condition with no stray light. In contrast, FIG. 15 is a drawing corresponding to FIG. 6, and shows an example of a beam spot on the focus near side acceptance section 10-1 shown in FIG. 13 in the condition with stray light.

Figure 15:
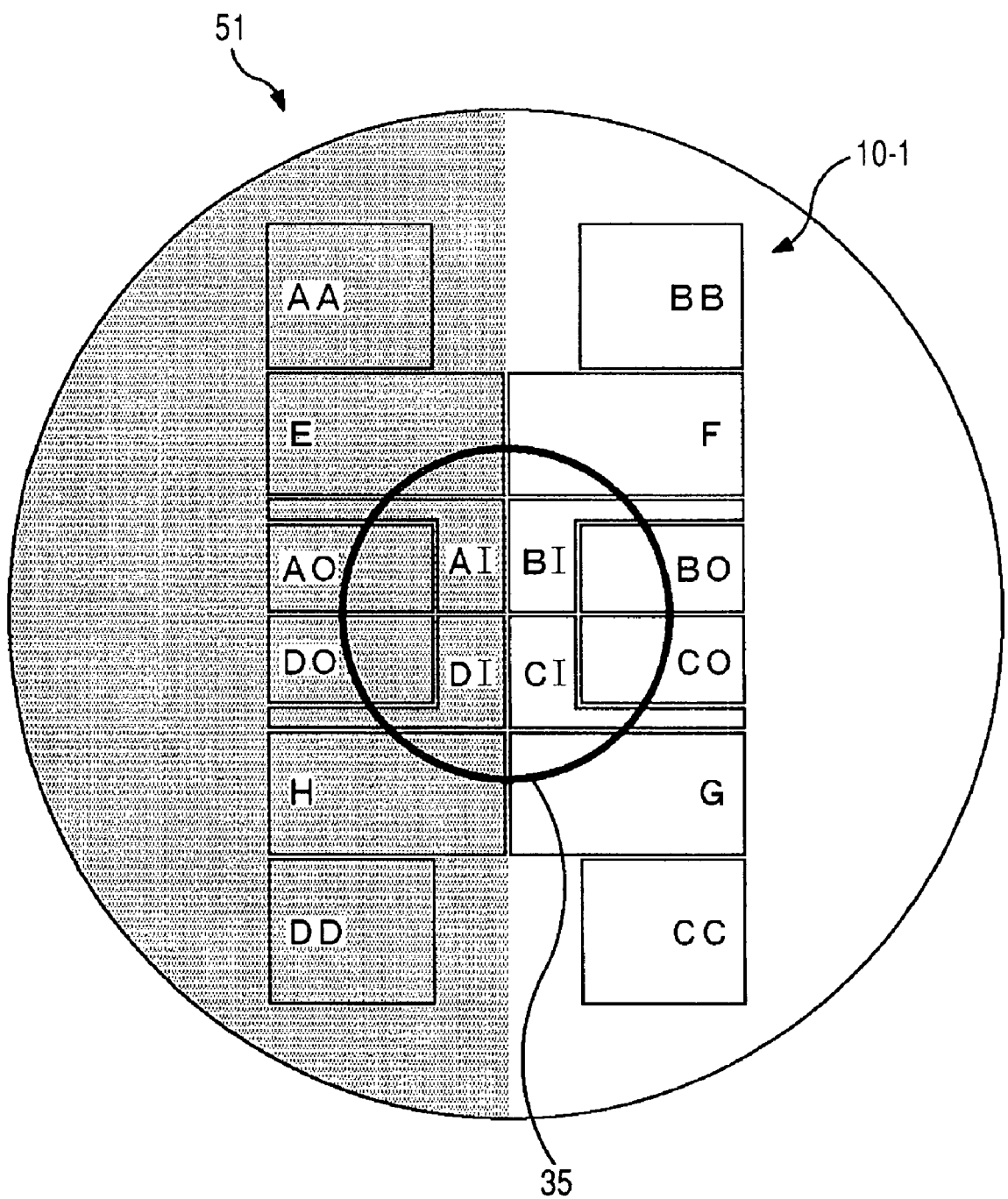
FIG. 15 is a diagram showing an example of a beam spot on the focus near side acceptance surface of the photodetector shown in FIG. 13 in the case in which the optical disk shown in FIG. 1 is provided with a plurality of signal layers and the incident light to the optical disk passes over a boundary between a recorded section and a non-recorded section in the signal layer which is not in the condition of recording or reproducing a signal.

Specifically, while in the example shown in FIG. 4 and so on, the track direction middle region of the spot acceptance surface of the focus near side acceptance section 10-1 is divided into four light acceptance areas A through D, in the example shown in FIGS. 13 through 15, in contrast, each of the four light acceptance areas A through D is further divided into two, and as a result, light acceptance areas AO, AI, BO, BI, CO, CI, DO, and DI are formed.

It should be noted that in the example shown in FIG. 13, one (the left one in FIG. 13) in the outer side of the light acceptance surface out of the two light acceptance areas obtained by dividing the light acceptance area A is defined as a light acceptance area AO, and one (the right one in FIG. 13) in the center side of the light acceptance surface is defined as a light acceptance area AI. One (the right one in FIG. 13) in the outer side out of the two light acceptance areas obtained by dividing the light acceptance area B is defined as a light acceptance area BO, and one (the left one in FIG. 13) in the center side is defined as a light acceptance area BI. One (the right one in FIG. 13) in the outer side out of the two light acceptance areas obtained by dividing the light acceptance area C is defined as a light acceptance area CO, and one (the left one in FIG. 13) in the center side is defined as a light acceptance area CI. One (the left one in FIG. 13) in the outer side out of the two light acceptance areas obtained by dividing the light acceptance area D is defined as a light acceptance area DO, and one (the right one in FIG. 13) in the center side is defined as a light acceptance area DI.

Each of the light acceptance areas AI, BI, CI, and DI in the center side in the track direction middle region has an L-shape in order for connecting the photodiode provided to itself (note that the photodiodes and the head amplifiers connected to the cathodes of the photodiodes are not shown in the example shown in FIG. 1), in other words, in order for supplying the head amplifiers with the output signals thereof. It should be noted that the L-shape described here is not required to be the L-shape in a strict sense, but includes a shape formed by connecting each end of two straight lines which are not disposed at least in parallel (do not form a single straight line).

In other words, one end out of the two ends (the opposite ends of the two lines forming the L-shape to the ends thereof connected to each other) of each of the light acceptance areas AI, BI, CI, and DI each having an L-shape is disposed on the outer periphery of the light acceptance surface of the photodetector 10, thus the output signal is taken out from this end disposed on the outer periphery. It should be noted that the end out of the two ends of each of the light acceptance areas AI, BI, CI, and DI each having an L-shape, from which the output signal is taken out, is hereinafter referred to as a signal output end.

In such a case as in the example shown in FIG. 13, namely in the case in which the spot acceptance surface of the focus near side acceptance section 10-1 is divided into twelve light acceptance areas AO through DO, AI through DI, and E through H, the focus error signal FE, the tracking error signal TE, and the spherical aberration signal SA can be calculated as follows, for example.

It should be noted that in this case, although not shown in the drawings, as described above, the photodiodes of the photodetector 10 and the subsequent head amplifiers 11 are provided corresponding respectively to the light acceptance areas AO through DO, AI through DI, E through H, AA through DD, and I through K shown in FIG. 13.

In this case, the focus error signal operating circuit 21 shown in FIG. 1 can perform the operation of the following formula 8, for example, and output the result as the focus error signal FE.

$$FE=(ao+co+e+g+ai+ci)-(bo+do+f+h+bi+di) \qquad (8)$$

Alternatively, the focus error signal operating circuit 21 can also perform the operation of the following formula 9, for example, and output the result as the focus error signal FE. In this case, since the operation of the formula 9 is an operation excluding the light acceptance areas AO, BO, CO, and DO for detecting the push-pull component (the relative displacement between the track and the light beam), the focus error signal FE calculated along the formula 9 becomes a focus error signal with reduced confusion of the push-pull component. Therefore, in the case in which an optical disk with a large push-pull component such as a DVD-RAM is adopted as the optical disk 31, it becomes possible to realize a stable focus servo operation when the optical disk 31 is reproduced using the astigmatic method.

$$FE=\{(ao+bo+co+do+ai+bi+ci+di)+\kappa^*(j+k)\}-\{e+f+g+h+\kappa^*i\} \qquad (9)$$

Further, the tracking error signal operating circuit 22 can calculate and output the tracking error signal TE utilizing a single spot push-pull method (PP) in the case in which a recordable disk is adopted as the optical disk 31, or mainly utilizing a differential phase detection (DPD) method in the case in which a read-only optical disk (ROM) having an information pit string previously formed thereon is adopted as the optical disk 31.

Specifically, in the single spot push-pull method, the tracking error signal TE is calculated along the formula 2 described above, for example. In other words, in the case in which the focus near side acceptance section 10-1 of the example shown in FIG. 13 is implemented, the tracking error signal operating circuit 22 can output the tracking error signal TE-PP, in which the lens movement component is removed from the push-pull component, and the push-pull offset caused by the stray light is removed, and which is therefore stable without the offset, in completely the same way.

Further, in the differential phase detection method, the tracking error signal TE is calculated along the following formula 10, for example. It should be noted that in the formula 10, the tracking error signal TE is particularly described as TE-DPD in order for indicating that it is calculated using the differential phase detection method. Here in the following formula 10, an operator $\phi$ represents a signal phase.

$$TE\text{-}DPD=\phi(ao+co+e+g+ai+ci)-\phi(bo+do+f+h+bi+di) \qquad (10)$$

Further, the spherical aberration signal operating circuit 23 can calculate a second focus error signal FE2 (a focus error signal FE2 in the outer circumferential part of the beam spot 35 shown in FIG. 14) in accordance with a following formula 11, for example, or calculate a third focus error signal FE3 (a focus error signal FE3 in the inner circumferential part of the beam spot 35) in accordance with a following formula 12, for example, to output either one of the two focus error signals FE2, FE3, namely FE2 for example, as the spherical aberration signal SA.

$$FE2=(e+f+g+h)-(j+k) \qquad (11)$$

$$FE3=i-(ao+bo+co+do+ai+bi+ci+di) \qquad (12)$$

$$SA=FE2 \qquad (13)$$

In a focused condition with small spherical aberration of the irradiated light beam on the optical disk 31, the intensity of the beam spot 35 formed on the light acceptance surface of the photodetector 10 becomes substantially even throughout the entire surface. Therefore, as shown in the Formulas 11 through 13 described above, both of the two focus error signals FE2, FE3 become nearly zero, and as a result, the spherical aberration signal SA also becomes nearly zero.

On the other hand, if the spherical aberration is caused in the irradiated light on the optical disk 31, the beam spot 35 formed on the light acceptance surface of the photodetector 10 has a intensity distribution different between the inner circumferential part and the outer circumferential part, and as a result, the two focus error signals FE2, FE3 have different value from each other. Therefore, the spherical aberration signal SA becomes to have a certain value other than zero, thus the spherical aberration can be detected from the spherical aberration signal SA having the value other than zero.

Further, an optical disk drive implementing the focus near side acceptance section 10-1 shown in FIG. 16 instead of the focus near side acceptance section 10-1 shown in FIG. 13 is also an embodiment of the optical disk drive to which the present invention is applied. It should be noted that regarding the focus far side acceptance section 10-2, the same as shown in FIG. 13 is implemented.

In other words, as described above, the alignment positions of the stray light acceptance areas AA through DD can be any positions providing the operation of $\beta^*\{(aa+dd)-(bb+cc)\}$ in the formula 2 becomes possible. Specifically, for example, it is sufficient for the stray light acceptance areas AA, DD to be disposed at any positions inside the gray area in the stray beam spot 51 shown in FIG. 14, and they can be disposed as in the example shown in FIG. 13, or disposed as in the example shown in FIG. 16. Further, it is sufficient for the stray light acceptance areas BB, CC to be disposed at any positions inside the white area in the stray beam spot 51 shown in FIG. 14, and they can be disposed as in the example shown in FIG. 13, or disposed as in the example shown in FIG. 16.

By adopting the photodetector implementing the present invention described hereinabove, namely the photodetector (a pickup device) having the spot acceptance surface divided into eight or twelve light acceptance areas according to the dividing method described above, and also provided with the stray light acceptance surface, or by adopting the optical disk drive mounting such a photodetector, it becomes possible to obtain at least first through fourth advantages described as follows.

Specifically, the first advantage is that since detection by the differential phase detection (DPD) method, which is difficult by the single spot push-pull method in the related art, becomes possible, it becomes possible to cope with various kinds of optical disks with a single photodetector.

The second advantage is that since not only detection of the spherical aberration signal but also detection of the focus error signal with reduced confusion of the push-pull component becomes possible using a single photodetector, a highly functionalized optical pickup can easily be realized.

The third advantage is that since the deterioration in the reproducing signal can be suppressed even if the photodetector is divided into an increased number of elements in order for obtaining the servo signals, all of the signals can be detected by a single light beam without divaricating the light beam for detecting the reproducing signal, thus deterioration in the servo error signal or the reproducing signal can be suppressed to the minimum even in the reproduction of the optical disk having two or more signal layers.

The fourth advantage is that by removing especially the influence of the stray light in the boundary between the recorded section and the non-recorded section out of the influences caused on the push-pull signal when performing the focus detection, the stable tracking operation can be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk drive for performing at least one of recording and reproducing an information signal on an optical disk having one or more information recording layers stacked one another on which the information signal is one of recorded and to be recorded in a predetermined track format, comprising:

focusing means for condensing a light beam on the optical disk;

moving means for moving the focusing means in a direction perpendicular to a track direction of the optical disk;

light detection means having
   a first light acceptance section accepting a light beam obtained as a result of reflection of the light beam condensed on the optical disk by the focusing means by one of the one or more information recording layers and
   a second light acceptance section accepting stray light obtained as a result of reflection of the light beam by another of the one or more information recording layers;

tracking error signal generating means for generating a first tracking error signal representing a relative displacement between a track of the one of the information recording layers and the light beam using an output of the first light acceptance section, and correcting the first tracking error signal using an output of the second light acceptance section; and tracking control means for performing tracking control by driving the moving means in accordance with the first tracking error signal generated and corrected by the tracking error signal generating means, wherein the light beam from the optical disk to the light detection means has a track direction of the optical disk on the light detection means even if a position of the first light acceptance section in an optical axis direction is changed, the second light acceptance section comprises a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers, and the tracking control means performs correction for removing an offset in the first tracking error signal caused by the stray light from the another of the one or more information recording layers using a difference between an output of the disk inner circumferential area and an output of the disk outer circumferential area in the second light acceptance section.

2. The optical disk drive according to claim 1 further comprising:

discrimination means for discriminating a number of the information recording layers stacked in the optical disk based on the output of the second light acceptance section; and control means for changing settings of the light detection means in accordance with the number of the information recording layers discriminated by the discrimination means.

3. The optical disk drive according to claim 2 wherein the discrimination means discriminates the number of the information recording layers of the optical disk based on presence or absence and an amount of the stray light from the another of the information recording layers as the output of the second light acceptance section.

4. The optical disk drive according to claim 1 wherein the first light acceptance section is divided in a direction perpendicular to the track direction of the one of the information recording layers into a first track direction end region as a light acceptance area in one end in the track direction, a second track direction end region as a light acceptance area in the other end in the track direction, and a track direction middle region as a light acceptance area in the middle in the track direction, further the track direction middle region is divided into at least two in a direction perpendicular to the track direction, and each of the light acceptance areas is divided into two in a direction parallel to the track direction, resulting in two light acceptance areas formed in the first track direction end region, two light acceptance areas formed in the second track direction end region, and at least four light acceptance areas formed in the track direction middle region.

5. The optical disk drive according to claim 4 wherein the tracking control means further generates a second tracking error signal using a differential phase detection (DPD) method using an output of each of the two light acceptance areas formed in the first track direction end region, the two light acceptance areas formed in the second track direction end region, and the at least four light acceptance areas formed in the track direction middle region, and the tracking control means further performs the tracking control in accordance with the second tracking error signal instead of the first tracking error signal.

6. The optical disk drive according to claim 1, further comprising:

focus error signal generating means for generating a focus error signal by detecting a size of a beam spot on the light detection means.

7. A pickup device to be mounted on an optical disk drive for performing at least one of recording and reproducing an information signal on an optical disk having one or more information recording layers stacked one another on which the information signal is one of recorded and to be recorded in a predetermined track format, comprising:

a first light acceptance section accepting a light beam obtained as a result of reflection of the light beam, which is irradiated by the optical disk drive and condensed on the optical disk, by one of the one or more information recording layers of the optical disk, and a second light acceptance section accepting stray light obtained as a result of reflection of the light beam by another of the one or more information recording layers, wherein the light beam from the optical disk to the pickup device has a track direction of the optical disk on the optical pickup device even if a position of the first light acceptance section in an optical axis direction is changed, and the second light acceptance section comprises a disk inner circumferential side area and a disk outer circumferential side area respectively disposed at positions in the light detection means, which are symmetrical about the track direction in the one of the information recording layers, and where the stray light from the another of the information recording layers is accepted without accepting the light beam from the one of the information recording layers.

8. An optical disk drive for performing at least one of recording and reproducing an information signal on an optical disk having one or more information recording layers stacked one another on which the information signal is one of recorded and to be recorded in a predetermined track format, comprising:

a focusing section condensing a light beam on the optical disk;

a moving section moving the focusing section in a direction perpendicular to a track direction of the optical disk;

a light detection section having a first light acceptance section accepting a light beam obtained as a result of reflection of the light beam condensed on the optical disk by the focusing section by one of the one or more information recording layers and a second light acceptance section accepting stray light obtained as a result of reflection of the light beam by another of the one or more information recording layers;

a tracking error signal generating section generating a first tracking error signal representing a relative displacement between a track of the one of the information recording layers and the light beam using an output of the first light acceptance section, and correcting the first tracking error signal using an output of the second light acceptance section; and a tracking control section performing tracking control by driving the moving section in accordance with the first tracking error signal generated and corrected by the tracking error signal generating section, wherein the light beam from the optical disk to the light detection section has a track direction of the optical disk on the light detection section even if a position of the first light acceptance section in an optical axis direction is changed, the second light acceptance section comprising a disk inner circumferential side area and a disk outer circumferential side area respectively disposed at positions in the light detection section, which are symmetrical about the track direction in the one of the information recording layers, and where the stray light from the another of the information recording layers is accepted without accepting the light beam from the one of the information recording layers, and the tracking control section performs correction for removing an offset in the first tracking error signal caused by the stray light from the another of the one or more information recording layers using a difference between an output of the disk inner circumferential area and an output of the disk outer circumferential area in the second light acceptance section.

9. The optical disk drive according to claim 1, wherein the disk inner circumferential side area is arranged to detect stray light reflected from a recorded section in the another of the information recording layers and the disk outer circumferential side area is arranged to detect stray light reflected from a non-recorded section in the another of the information recording layers.

10. The pickup device according to claim 7, wherein the disk inner circumferential side area is arranged to detect stray light reflected from a recorded section in the another of the information recording layers and the disk outer circumferential side area is arranged to detect stray light reflected from a non-recorded section in the another of the information recording layers.

11. The optical disk drive according to claim 8, wherein the disk inner circumferential side area is arranged to detect stray light reflected from a recorded section in the another of the information recording layers and the disk outer circumferential side area is arranged to detect stray light reflected from a non-recorded section in the another of the information recording layers.

* * * * *